United States Patent
Uchikawa

(10) Patent No.: US 11,570,142 B2
(45) Date of Patent: Jan. 31, 2023

(54) REQUESTING NAME RESOLUTION FROM DETERMINED EXTERNAL DNS SERVER

(71) Applicant: CANON KABUSHIKI KAISHA, Tokyo (JP)

(72) Inventor: Shinichi Uchikawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 17/119,332

(22) Filed: Dec. 11, 2020

(65) Prior Publication Data
US 2021/0203631 A1    Jul. 1, 2021

(30) Foreign Application Priority Data

Dec. 25, 2019    (JP) .............................. JP2019-235096

(51) Int. Cl.
*H04L 61/4511*    (2022.01)
*H04L 61/3015*    (2022.01)
*H04L 61/58*    (2022.01)
*H04L 61/4552*    (2022.01)

(52) U.S. Cl.
CPC ...... *H04L 61/4511* (2022.05); *H04L 61/3015* (2013.01); *H04L 61/3025* (2013.01); *H04L 61/4552* (2022.05); *H04L 61/58* (2022.05)

(58) Field of Classification Search
CPC ............. H04L 61/3015; H04L 61/3025; H04L 61/4511; H04L 61/4552; H04L 61/58
USPC ........................................................ 709/245
See application file for complete search history.

(56) References Cited

U.S. PATENT DOCUMENTS

| | | | | |
|---|---|---|---|---|
| 10,819,697 | B1* | 10/2020 | McPherson | ......... H04L 61/4511 |
| 2002/0010798 | A1* | 1/2002 | Ben-Shaul | .............. H04L 67/52 |
| | | | | 707/E17.116 |
| 2006/0112176 | A1* | 5/2006 | Liu | ....................... H04L 67/101 |
| | | | | 709/245 |

(Continued)

FOREIGN PATENT DOCUMENTS

JP        2010-193015 A      9/2010

OTHER PUBLICATIONS

JP2010193015 English machine-translation, WIPO IP Portal, pp. 1-32, Feb. 9, 2010 publication date. (Year: 2010).*

*Primary Examiner* — David P Zarka
(74) *Attorney, Agent, or Firm* — Canon U.S.A., Inc. I.P. Division

(57) ABSTRACT

A communication apparatus that transmits data outside via different communication interfaces performs operations, including setting an interface correspondence between a domain name identifying a domain and a communication interface for use with an external apparatus belonging to the domain, generating, from the set interface correspondence, a setting indicating a Domain Name System (DNS) server correspondence between the domain name and the DNS server to which name resolution for a host name of the external apparatus is to be transferred, and activating a DNS cache server that operates from the generated setting. A DNS client requested for the host name resolution by an application of the communication apparatus transmits a name resolution request to the DNS cache server. Based on the received host name, the DNS cache server determines an external DNS server to which the name resolution is requested, and requests the determined external DNS server for the name resolution.

15 Claims, 14 Drawing Sheets

(56) References Cited

U.S. PATENT DOCUMENTS

| | | | | |
|---|---|---|---|---|
| 2009/0019145 A1* | 1/2009 | Nakanishi | H04L 61/58 | |
| | | | 709/224 | |
| 2009/0222584 A1* | 9/2009 | Josefsberg | H04L 61/4511 | |
| | | | 709/245 | |
| 2014/0149578 A1* | 5/2014 | Goldman | H04L 45/02 | |
| | | | 709/224 | |
| 2014/0149601 A1* | 5/2014 | Carney | H04L 67/52 | |
| | | | 709/238 | |
| 2014/0207835 A1* | 7/2014 | Jellick | H04L 61/4511 | |
| | | | 707/827 | |
| 2014/0245359 A1* | 8/2014 | De Foy | H04L 65/612 | |
| | | | 725/62 | |
| 2016/0094645 A1* | 3/2016 | Ashutosh | H04L 67/1023 | |
| | | | 709/226 | |
| 2016/0218977 A1* | 7/2016 | Lapidous | H04L 12/4641 | |
| 2017/0093802 A1* | 3/2017 | Norum | H04L 63/0428 | |
| 2017/0373962 A1* | 12/2017 | Keeley | H04L 43/0888 | |
| 2019/0036871 A1* | 1/2019 | Lapidous | H04L 61/10 | |
| 2021/0400010 A1* | 12/2021 | Uchikawa | H04N 1/32771 | |

\* cited by examiner

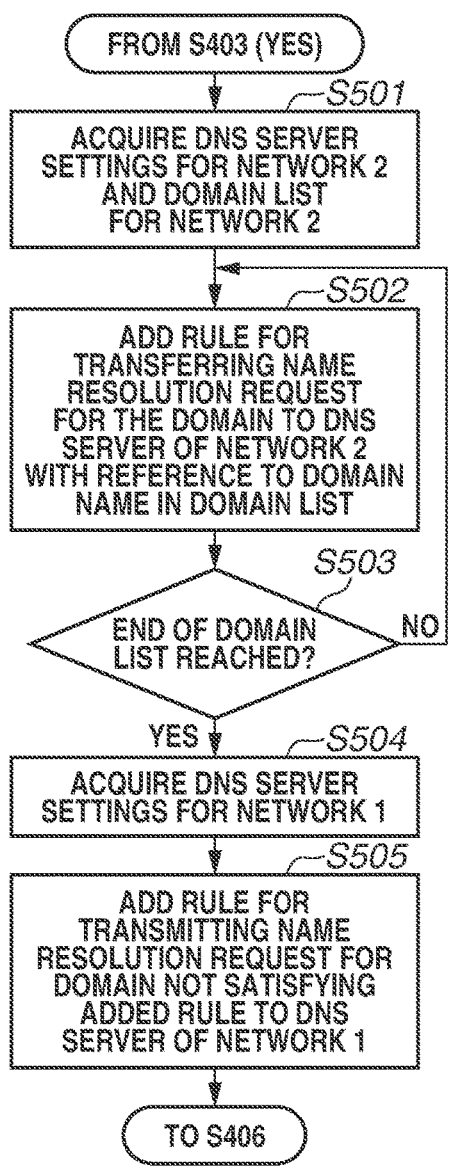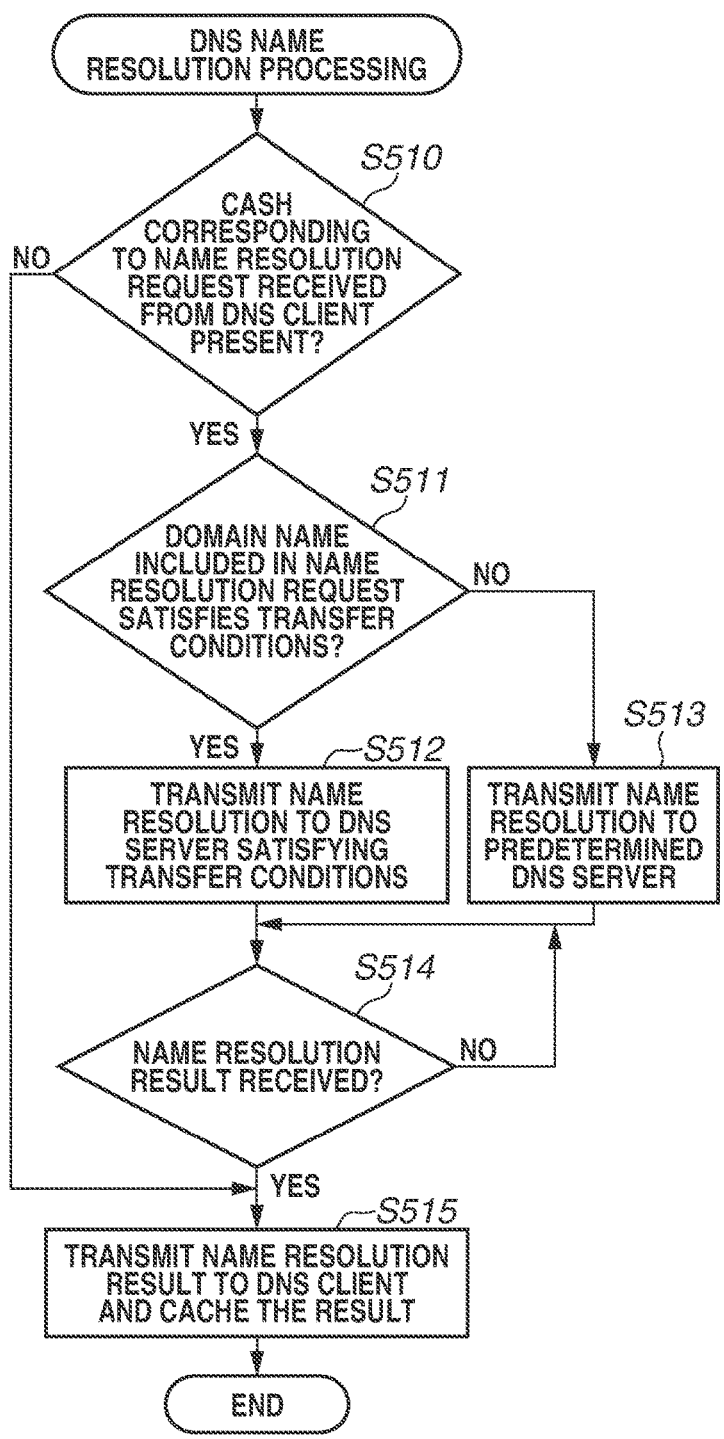

FIG.7A

DNS SETTINGS FOR NETWORK 1

```
nameserver    172.24.10.1
nameserver    172.24.10.2
```

FIG.7B

DNS SETTINGS FOR NETWORK 2

```
nameserver    10.10.10.1
nameserver    10.10.10.2
```

FIG.7C

SETTING FILE FOR DNS CACHE SERVER

```
forward-zone:
      name: "example.org"
      forward-addr: 10.10.10.1
      forward-addr: 10.10.10.2
forward-zone:
      name: "test.org"
      forward-addr: 10.10.10.1
      forward-addr: 10.10.10.2
```
} 710

```
forward-zone:
      name: " . "
      forward-addr: 172.24.10.1
      forward-addr: 172.24.10.2
```
} 720

FIG.11

```
NETWORK SETTINGS > NETWORK 2 (INTERNET) SETTINGS           ~1100
< DNS SETTING >
    AUTOMATIC ACQUISITION      [ ON ]   [ OFF ]
    OF DNS SERVER
        [ 10.10.10.1 ]
        [ 10.10.10.2 ]

< NAME RESOLUTION SETTINGS FOR NETWORK 2 >
        [ example.org ]
        [ test.org    ]
        [             ]
        [             ]

1101~ [ IMPORT ]  [ REGISTER NEW DOMAIN ]  [ EDIT ]
  * PRE-REGISTERING DOMAIN NAME OF SERVER ON NETWORK 2 WILL
    ENABLE NAME RESOLUTION USING DNS SERVER OF NETWORK 2.
  * NETWORK 1 ("LAN1") WILL BE REQUESTED FOR NAME RESOLUTION
    FOR HOST NAME BELONGING TO UNREGISTERED DOMAIN.

< NAME SETTING >
  NETWORK NAME      [ INTERNET ]

[ RETURN ]            [ ENTER ]
```

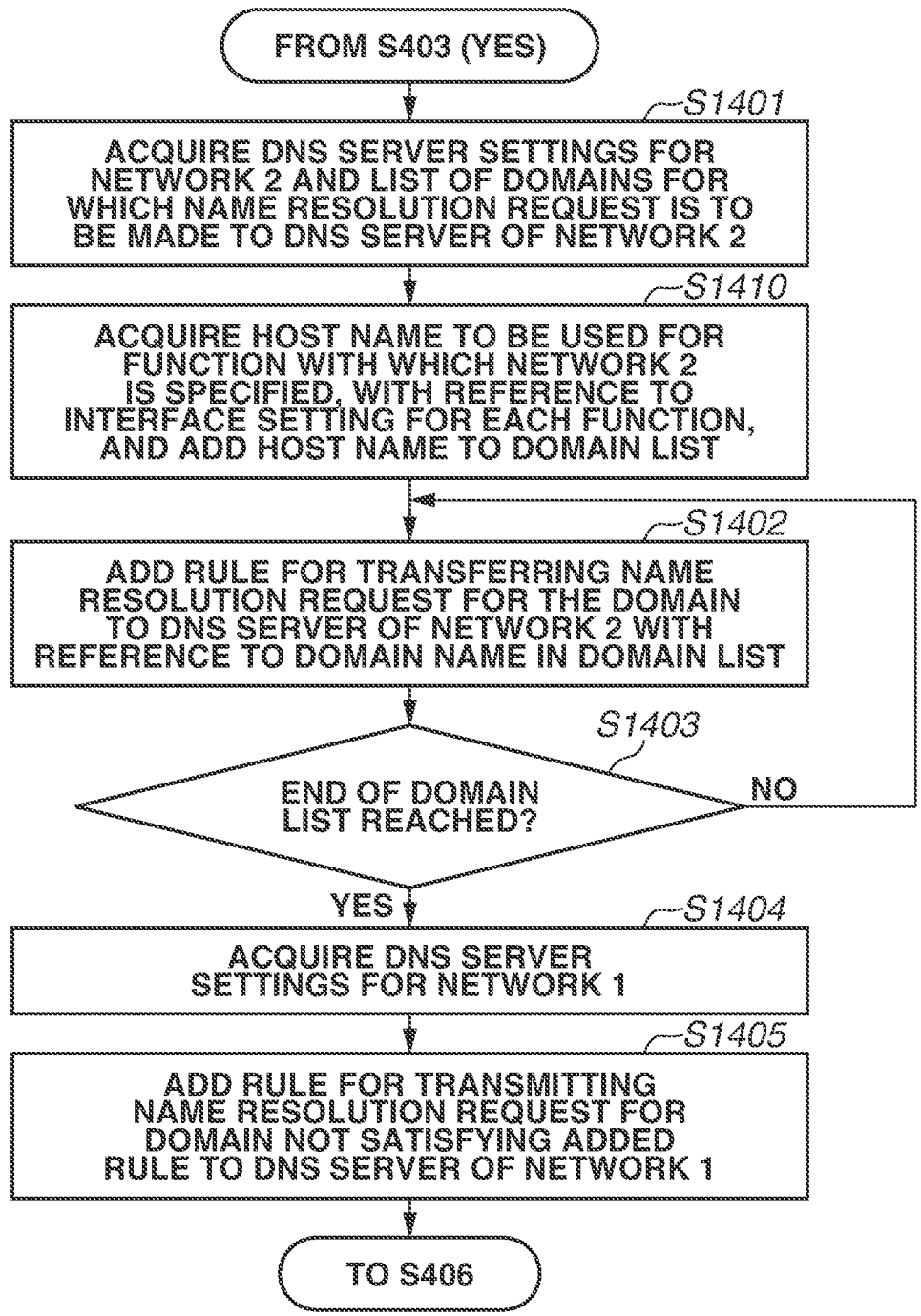

REQUESTING NAME RESOLUTION FROM DETERMINED EXTERNAL DNS SERVER

BACKGROUND

Field

The present disclosure relates to a communication apparatus that transmits data to the outside.

Description of the Related Art

In recent years, due to the increasing demand in the network security and the functional complexity thereof, it has become common to selectively use a plurality of Local Area Networks (LANs) in offices and commercial facilities. These networks are separated from each other and independently manages respective domain names. Multi-Function Peripherals (MFPs) and other communication apparatuses used under such network environments are also demanded to support a plurality of networks.

Japanese Patent Application Laid-Open No. 2010-193015 discloses a method for effectively performing name resolution for domain names in an environment where a communication terminal is connected to a plurality of networks where domain name management is performed. Japanese Patent Application Laid-Open No. 2010-193015 discusses a communication apparatus where a communication terminal includes a plurality of network interfaces. One network interface is connected to a wide area network, and the other network interface is connected to a closed area network. The communication apparatus manages Domain Name System (DNS) servers used for name resolution for respective network interfaces. The communication apparatus attempts to make a query to the DNS server for the wide area network, and determines that the network interface is connected to the wide area network if the Internet Protocol (IP) address can be acquired and determines that the network interface is connected to the closed area network if the IP address cannot be acquired. Then, the communication apparatus stores the result of the determination in a network list, and implements name resolution by using the network list.

An example of a method for implementing name resolution in a common LAN interface will be described below with reference to an example of control in a LINUX (registered trademark) system. In a case where name resolution for domain names is performed in a Unix-like operating system such as the LINUX system, a DNS server is specified through a description about the DNS server in a predetermined file. More specifically, a DNS server to be used can be specified by giving a description of, for example, "nameserver IP_address_of_DNS_server" to a file located at "/etc/resolve.conf". A plurality of DNS servers can also be specified for redundancy. In this case, a similar description needs to be included in the "conf" file the number of times equal to the number of DNS servers.

However, the DNS servers registered in this case are each a DNS server for redundancy to be used as a substitute in a case where no response is received from a registered DNS server. Therefore, in a case where no applicable name is found as a result of DNS name resolution (i.e., in a case where communication with the server has succeeded but name resolution has failed), the communication apparatus does not have a name and thus does not make a query to the DNS server to be used as a substitute.

SUMMARY

According to an aspect of the present disclosure, a communication apparatus to transmit data outside the communication apparatus via a plurality of different communication interfaces includes at least one memory that stores instructions, and at least one processor to execute the instructions to perform operations including: setting a communication interface correspondence between a domain name and a communication interface, from the plurality of different communication interfaces, to be used for communication with an external apparatus belonging to a domain identified by the domain name, generating, based on the set communication interface correspondence, a setting indicating a Domain Name System (DNS) name resolution server correspondence between the domain name and the DNS name resolution server to which name resolution for a host name of the external apparatus belonging to the domain identified by the domain name is to be transferred, and activating a DNS cache server, wherein the DNS cache server operates based on the generated setting, wherein a DNS client requested for the name resolution for the host name by an application of the communication apparatus transmits a request for the name resolution to the DNS cache server, and wherein, based on the host name included in the received request for the name resolution, the DNS cache server determines an external DNS server to which the name resolution is requested, and requests the determined external DNS server for the name resolution.

Further features of the present disclosure will become apparent from the following description of exemplary embodiments with reference to the attached drawings.

BRIEF DESCRIPTION OF THE DRAWINGS

FIG. 5A is a flowchart illustrating creation of an query setting file to be used by a Domain Name System (DNS) cache server, which is an example of MFP control.

FIG. 5B is a flowchart illustrating name resolution control by the DNS cache server, which is an example of MFP control.

FIG. 7A illustrates examples of settings in a setting value database (DB) and a generated setting file.

FIG. 7B illustrates examples of settings in the setting value DB and a generated setting file.

FIG. 7C illustrates specific examples of settings in the setting value DB and a generated setting file.

FIG. 11 is a diagram illustrating an example of a setting screen related to a network according to a third exemplary embodiment.

FIG. 14 is a flowchart illustrating an example of MFP control according to the fourth exemplary embodiment.

DESCRIPTION OF THE EMBODIMENTS

Exemplary embodiments of the present disclosure will be described below with reference to the accompanying drawings. The following exemplary embodiments do not limit the present disclosure to the ambit of the appended claims. Not all of the combinations of the features described in the present exemplary embodiments are indispensable to the solutions of the present disclosure.

Firstly, preconditions will be described below. In a case of performing name resolution by using a common Domain Name System (DNS) client, such as the above-described LINUX (registered trademark) system, it is difficult to implement DNS name resolution for each network.

Also, in a case of reliably separating data to be transmitted to each network, an attempt to make a query to each network about name resolution may be impermissible, as is the case with the communication apparatus discussed in Japanese Patent Application Laid-Open No. 2010-193015.

For example, one network may have high confidentiality, and domain names managed by the network thus may not be permitted to be intercepted by the other network.

First Exemplary Embodiment

In a first exemplary embodiment, a communication apparatus is caused to function as a DNS cache server, and a mechanism is provided for suitably switching between DNS servers for name resolution by using the function of the DNS cache server. According to another aspect of the present exemplary embodiment, a mechanism is provided for registering, as a Domain Name System (DNS) name resolution server correspondence, a correspondence between a domain name and DNS servers as query destinations with a DNS cache server and differentiating the DNS servers subjected to name resolution by utilizing the DNS cache server. The present exemplary embodiment will be specifically described below.

Figure 1:
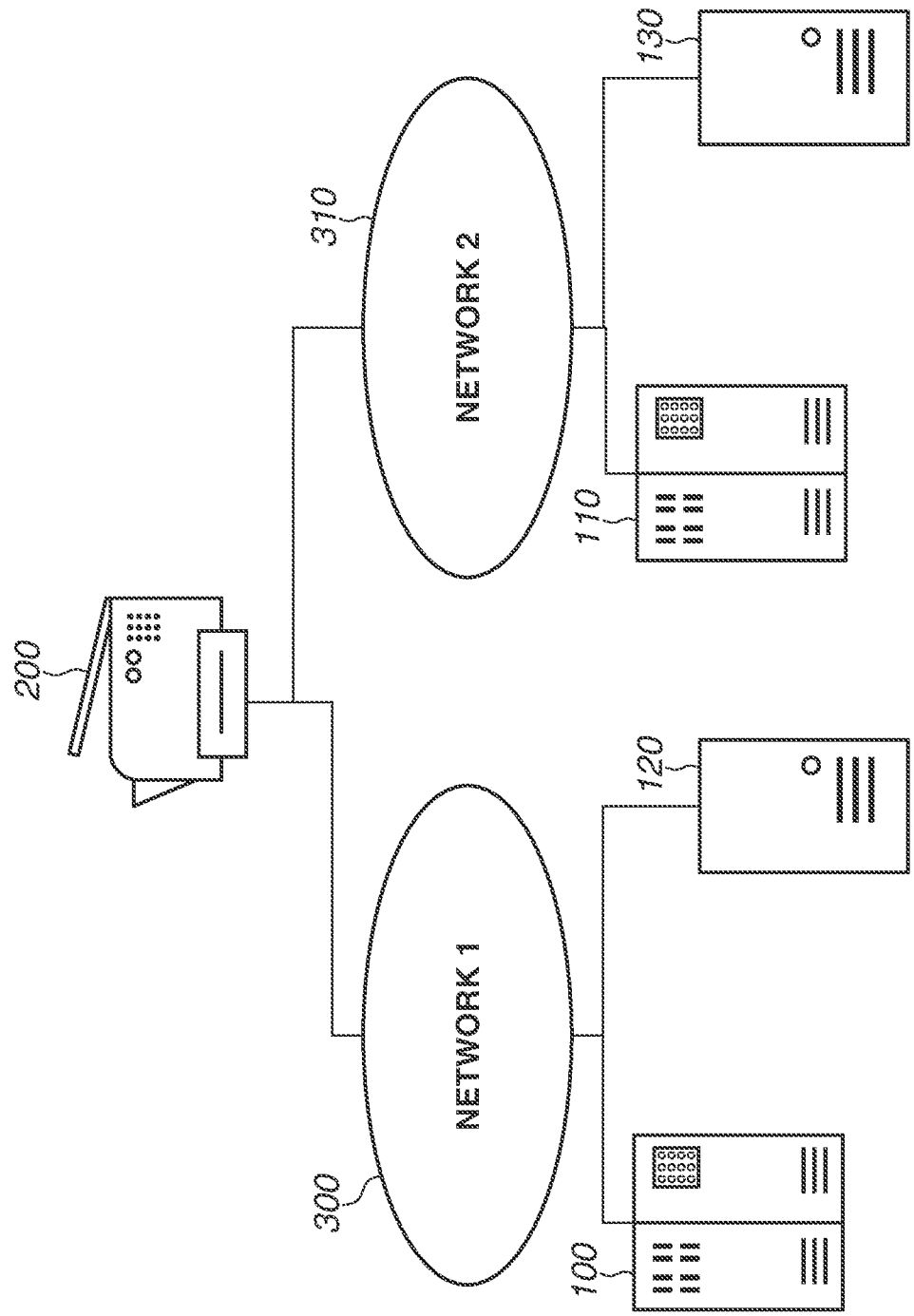
FIG. 1 is a diagram illustrating an example of a communication system.

A configuration of a communication system according to an exemplary embodiment of the present disclosure will be described below with reference to FIG. 1. In the communication system according to the present exemplary embodiment, a Multi-Function Peripheral (MFP) 200, a DNS server 100, and a device 120 are communicably connected with each other via a network 300. The device 120 is assigned a host name to be managed by the DNS server 100. The MFP 200, a DNS server 110, and a device 130 are also communicably connected with each other via a network 310. The device 130 is assigned a host name to be managed by the DNS server 110.

According to the present exemplary embodiment, the networks 300 and 310 are assumed to be independent different networks. More specifically, even if the DNS server 100 is requested for resolution of the host name of the device 130, the DNS server 100 cannot perform the name resolution. Likewise, even if the DNS server 110 is requested for resolution of the host name for the device 120, the DNS server 110 cannot perform the name resolution, either.

The MFP 200 is an example of a communication terminal. Although the present exemplary embodiment is described using an MFP having print and scan functions as an example, the present disclosure is not limited thereto. The present exemplary embodiment is also applicable to Internet of Things (IoT) devices, personal computers, and edge servers. The devices 120 and 130 are assumed to be, for example, file servers and information management servers that manage information about the MFP 200. However, the types of the devices are not limited thereto. The devices 120 and 130 may be servers for basic operation systems and cloud servers.

The MFP 200 can transmit data based on an image obtained through image scanning and transmit data collected by the MFP 200, to the devices 120 and 130. When transmitting data, the MFP 200 uses a destination in which the host name of the device 120 or 130 is specified. A method for name resolution in this case will be described below.

Figure 2:
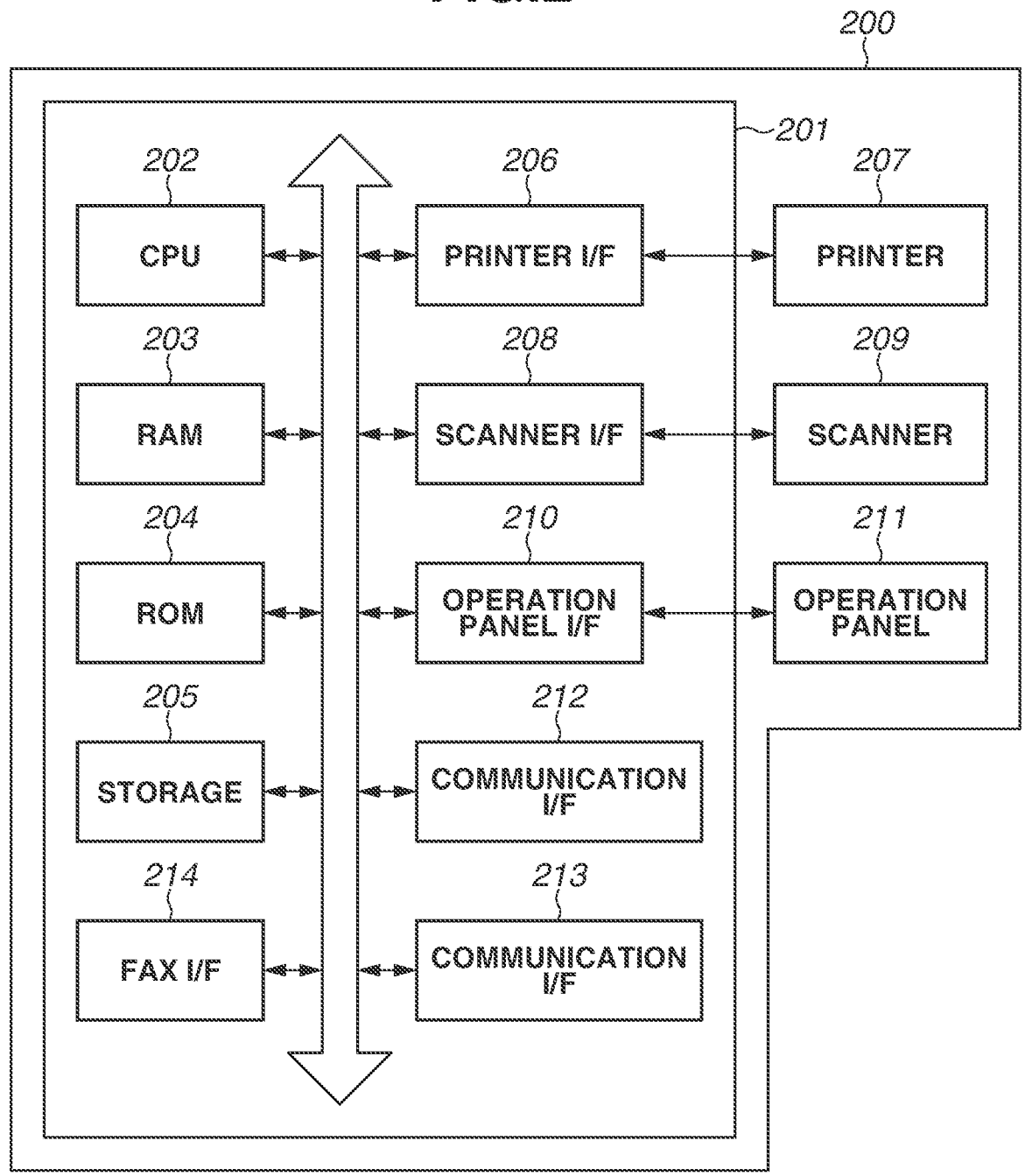
FIG. 2 is a diagram illustrating an example of a hardware configuration of a Multi-Function Peripheral (MFP).

The MFP 200 will be described below with reference to FIG. 2. FIG. 2 is a block diagram illustrating a hardware configuration of the MFP 200. The MFP 200 has a function of reading an image on a sheet, and a file transmission function of transmitting the read image to an external communication apparatus. The MFP 200 also has a function of printing an image on a sheet.

A control unit 201 including a Central Processing Unit (CPU) 202 controls operations of the entire MFP 200. The CPU 202 reads a control program stored in a read only memory (ROM) 204 or a storage 205 and then executes the program to implement print control, reading control, and other various control. The ROM 204 stores a control program that can be executed by the CPU 202. A random access memory (RAM) 203 is a main storage memory for the CPU 202 and is used as a work area, or a temporary storage area for loading various control programs. The storage 205 stores print data, image data, various programs, and various setting information. In this way, hardware components such as the CPU 202, the ROM 204, and the RAM 203 form a computer.

Although, in the MFP 200 according to the present exemplary embodiment, one CPU 202 performs each piece of processing illustrated in flowcharts (described below) by using one memory (RAM 203), other configurations are also applicable. For example, a plurality of processors, memories, or storages may be cooperatively operated to perform each piece of processing illustrated in flowcharts (described below). In addition, part of processing may be executed by hardware circuitry.

A printer I/F 206 connects a printer 207 (printer engine) and the control unit 201. The printer 207 prints an image on a sheet supplied from a sheet feeding cassette (not illustrated) based on print data input via the printer I/F 206. Applicable printing methods include an electrophotographic method in which toner is transferred onto paper and then fixed thereon, and an ink-jet method in which ink is discharged onto paper and printed thereon. The printer 207 may be a three-dimensional (3D) printer that generates a threedimensionally shaped output material by using a molding material. In this case, the print data indicates a 3D shape, and the printer 207 generates a 3D shaped output material by using a molding material and a support material instead of a coloring material such as toner and ink.

A scanner I/F 208 connects a scanner 209 and the control unit 201. The scanner 209 scans a placed document to generate image data. The image data generated by the scanner 209 is printed by the printer 207, stored in the storage 205, and transmitted to an external apparatus via a FAX I/F 214 and communication I/Fs 212 and 213.

An operation panel I/F 210 connects an operation panel 211 and the control unit 201. The operation panel 211 is provided with a liquid crystal display (LCD) having a touch panel function and various hardware keys, and functions as a display unit for displaying information and an acceptance unit for accepting user instructions. The CPU 202 controls information display and acceptance of user operations in collaboration with the operation panel 211.

The communication I/Fs 212 and 213 are each connected with a network cable to execute communication with an external apparatus via a network.

The communication I/F 212 as a first communication interface of the MFP 200 is connected to the network 300. The communication I/F 213 as a second communication interface of the MFP 200 is connected to the network 310.

Although, in the present exemplary embodiment, the communication I/Fs 212 and 213 are assumed to be communication interfaces that perform wired communication conforming to Ethernet (registered trademark), the configurations are not limited thereto. For example, either one of the communication I/Fs 212 and 213 may be a wireless communication interface conforming to Institute of Electrical and Electronics Engineers (IEEE) 802.11 Series, or both of the communication I/Fs 212 and 213 may be wireless communication interfaces. In addition, the communication I/Fs 212 and 213 may be communication interfaces that perform mobile communication such as 3rd generation (3G) communication such as Code Division Multiple Access (CDMA), 4th generation (4G) communication such as Long Term Evolution (LTE), and 5th generation (5G) communication.

The FAX I/F 214 is connected with a telephone line cable to be connected to a Public Switched Telephone Network (PTSN).

Figure 3:
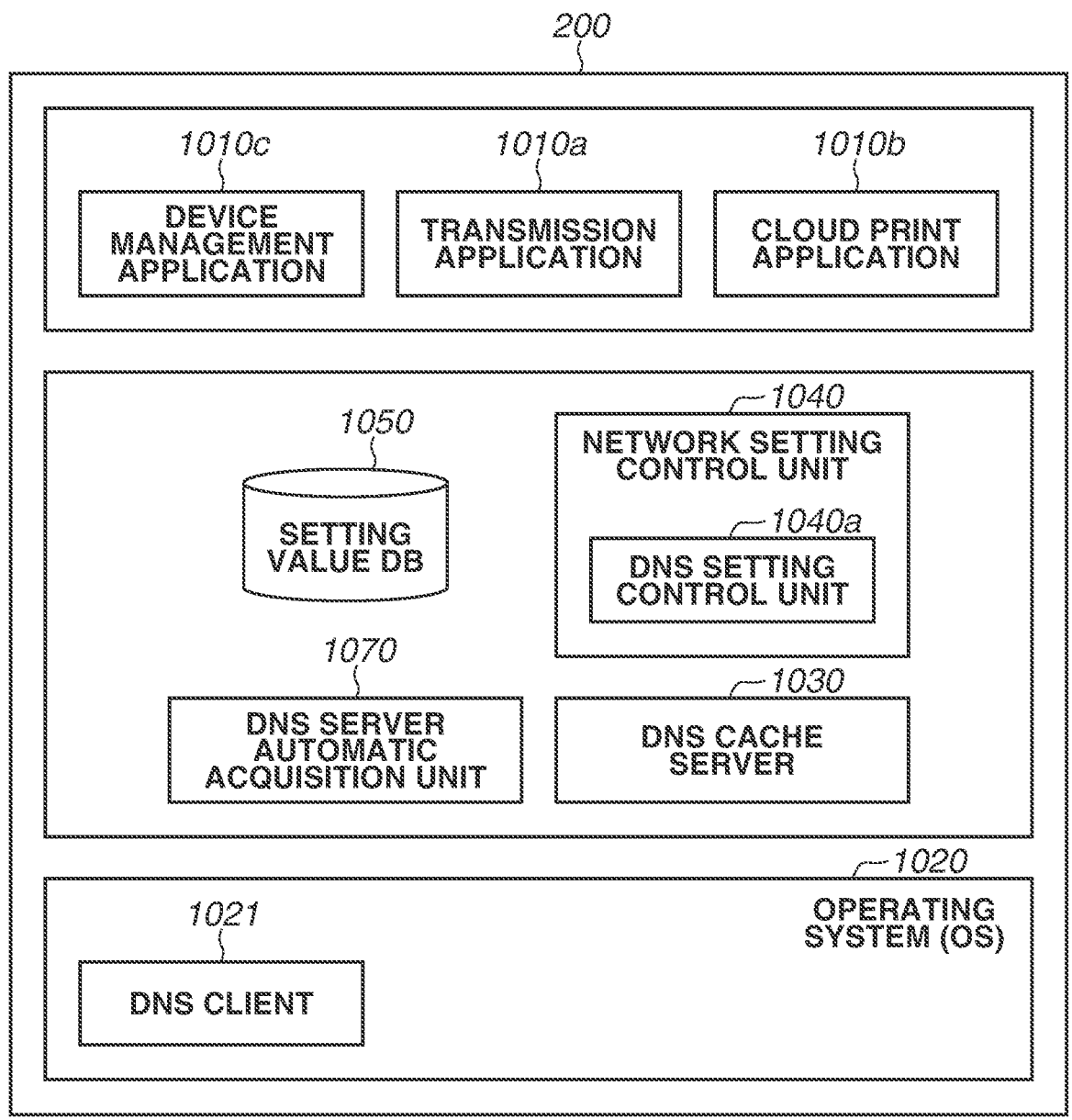
FIG. 3 is a diagram illustrating an example of a software configuration of the MFP.

A software configuration of the MFP 200 will be described below with reference to FIG. 3. A transmission application 1010a is an application that communicates with the device 120 connected to the network 300 and the device 130 connected to the network 310. For example, the transmission application 1010a transmits data to a device using Hyper Text Transfer Protocol (HTTP)-based communication, such as Web-based Distributed Authoring and Versioning (WebDAV)-based communication. The transmission application 1010a can transmit a file based on an image obtained through document scanning with the scanner 209, to a transmission destination specified by the user. The transmission destination can be specified by a user operation via a transmission setting screen (not illustrated). The user specifies a destination by inputting the host name of a file server in the Fully Qualified Domain Name (FQDN) format. According to the first exemplary embodiment, which interface is to be used by the transmission application 1010a is assumed to be preset by a user operation. Upon reception of selection of a key for starting transmission after a transmission destination is set via the transmission setting screen, the transmission application 1010a requests the scanner 209 to read a document. Subsequently, the transmission application 1010a transmits data based on an image obtained through document scanning to the transmission destination specified by the user. Although, in the present exemplary embodiment, WebDAV is described as an example of a transmission protocol, the transmission protocol is not limited thereto. For example, File Transfer Protocol (FTP), FTP Over SSL/TLS (FTPS), and other transmission protocols are also applicable.

A cloud print application 1010b is an application that communicates with a specific cloud print service. The cloud print application 1010b makes a query to a specific cloud print service (cloud server) about a job, downloads job data specified in the Uniform Resource Locator (URL) format from the cloud server or cloud storage, and prints the job data. Also, in these communications, the MFP 200 communicates with the destination specified by the host name and URL.

A device management application 1010c is an application that transmits device statuses to device management servers on the network. For example, the device management application 1010c transmits operation information including the status of a consumable material (e.g., ink, toner, molding materials, and support materials) of a printing apparatus, use results, and error information to the device management server. In communication with these device management servers, the MFP 200 communicates with the destination specified by the host name.

An operating system 1020 includes a Transmission Control Protocol/Internet Protocol (TCP/IP) protocol stack for performing network communication and a DNS client 1021 (standard DNS client for an operating system (OS)) for performing name resolution. In the present exemplary embodiment, the DNS client 1021 is assumed to be a standard DNS client of the Linux (registered trademark) system. In a case of performing name resolution for domain names by using these clients, a DNS server is specified by describing, for example, "nameserver 'IP address of DNS server'" in a file located at "/etc/resolve.conf". It is also possible to specify a plurality of DNS servers to be used for redundancy. The DNS client 1021 is provided with a function of requesting a specified DNS server for name resolution.

However, the DNS server registered here is a DNS server for redundancy that is to be used as a substitute in a case where no response is received from the registered DNS server. Therefore, if an applicable name is not found as a result of DNS name resolution (but communication has succeeded), the DNS client 1021 does not make a query to the DNS server to be used as a substitute. That is, there is an issue of difficulty in implementing DNS name resolution for each network when the DNS client of the Linux system is used.

In the present exemplary embodiment, a mechanism for activating a DNS cache server and performing name resolution by using the cache server will be described below.

A specific mechanism will be described below.

Operation settings of the MFP 200 including settings for the communication I/Fs 212 and 213 are stored in a setting value DB 1050. The settings for the communication I/Fs 212 and 213 include a setting indicating the enabled/disabled state of each communication interface and a setting indicating whether the address of the DNS server is automatically acquired. A domain name list (described below) is also stored in the setting value DB 1050.

A network setting control unit 1040 has functions of displaying a setting screen on the operation panel 211, accepting changes of various network settings from the user such as an administrator, and storing the settings in the setting value DB 1050. The network setting control unit 1040 includes a DNS setting control unit 1040a. The DNS setting control unit 1040a controls activations and operation settings of the DNS cache server 1030 and the DNS client 1021 with reference to the setting values in the setting value DB 1050.

The network setting control unit 1040 can also provide a web page for confirming and changing network settings in collaboration with a web server function (not illustrated). In this case, the user such as an administrator can access a web page provided by the MFP 200 from a client such as a personal computer (PC) and change the network settings.

Figure 6A:
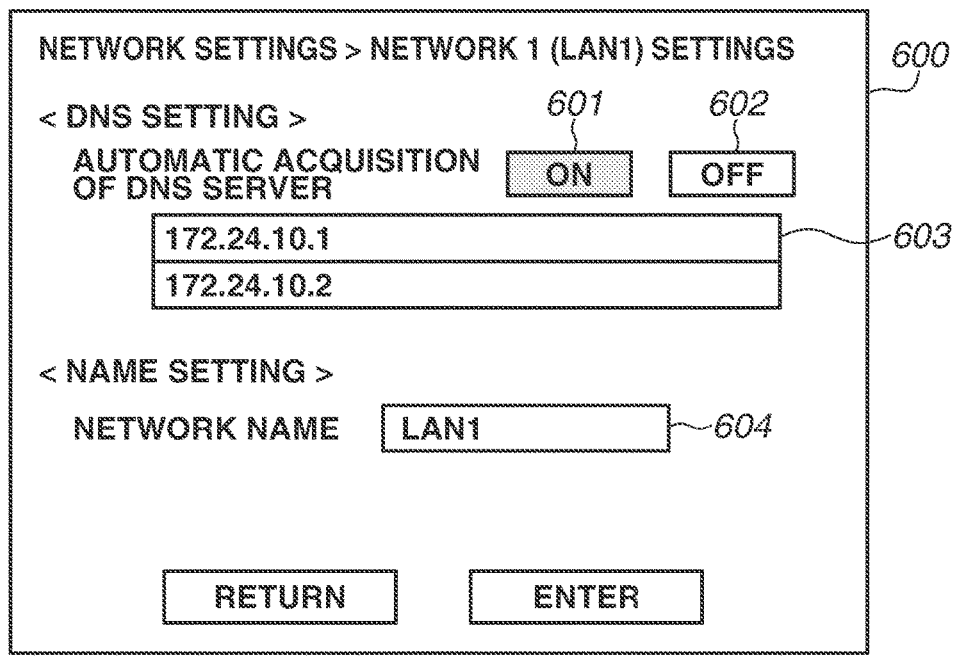
FIG. 6A illustrates an example of a setting screen related to a network.
Figure 6B:
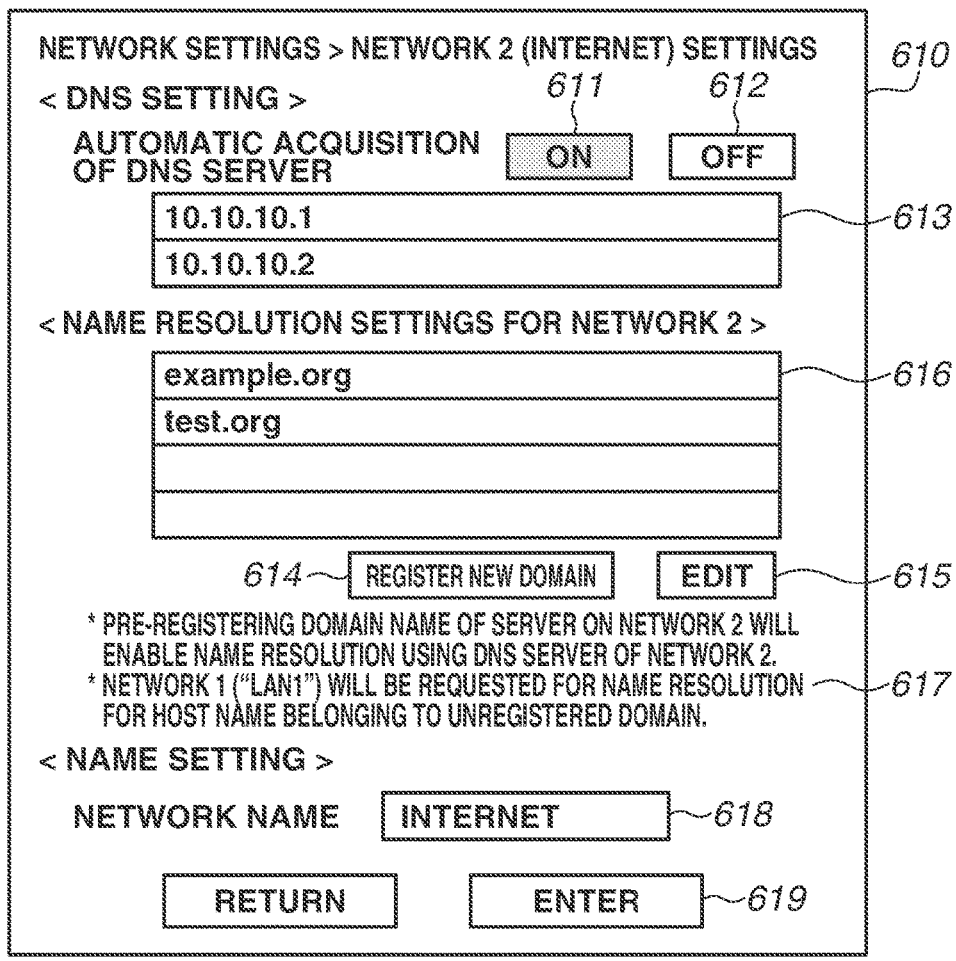
FIG. 6B illustrates an example of a setting screen related to a network.

Examples of the network settings will be described below with reference to FIGS. 6A and 6B. The present exemplary embodiment will be described below centering on an example case where both the communication I/Fs 212 and 213 are enabled. When a plurality of communication interfaces is enabled, either one communication interface functions as the primary network. In the present exemplary embodiment, a default gateway for transferring packets of which the routes are unknown is set to the communication interface that functions as the primary network. The other communication interface functions as the sub network that communicates with a communication apparatus belonging to the same network and also communicates with a communication apparatus in which a static route is preset to a communication interface thereof. In the present exemplary embodiment, the difference between the communication interface that functions as the default gateway and the communication interface that functions as the sub network is whether the default gateway can be set. However, the configuration is not limited thereto. The communication interface that functions as the sub network may have limited functions compared to the functions of the communication interface that functions as the primary network. For example, the use of some protocols may be limited.

A description will be given using a case where "Network 1" corresponding to the communication I/F 212 functions as the primary network, and "Network 2" corresponding to the communication I/F 213 functions as the sub network having lower priority than the primary network. Hereinafter, the communication I/F 212 is referred to as "Network 1", and the communication I/F 213 is referred to as "Network 2". In addition, the sub network is also referred to as the secondary network.

Network settings will be described below with reference to FIGS. 6A and 6B. FIGS. 6A and 6B are examples of setting screens displayed on the operation panel 211 by the network setting control unit 1040. FIG. 6A illustrates a setting screen 600 for "Network 1" that functions as the primary network, and FIG. 6B illustrates a setting screen 610 for "Network 2" that functions as the secondary network.

The user can make settings for the DNS server and can set a name (nickname) for the network via the setting screen 600. Keys 601 and 602 are display items for setting whether the Internet Protocol (IP) address of the DNS server is automatically acquired. Either one of the keys 601 and 602 is enabled, and the other key is disabled. In the present exemplary embodiment, the key 601 is enabled.

According to the present exemplary embodiment, display items collectively mean display objects including keys and buttons for accepting user operations, labels for displaying information, display areas, and drawn objects. Although a description will be given below using a case where a setting screen is displayed on the operation panel 211, similar settings can be also made by accessing a web page provided by the MFP 200 from a web browser of a client terminal.

An area 603 displays the settings of the DNS server assigned to Network 1. When the key 602 is enabled, and the setting for automatically acquiring the IP address of the DNS server is disabled, the area 603 functions as an area for manually setting the IP address of the DNS server. In this case, the user can manually set the DNS server by inputting the IP address via a software keyboard (not illustrated) displayed on the operation panel 211.

An area 604 is used to set a name of the network. By setting a nickname in the area 604, the user such as an administrator can easily distinguish a plurality of networks from each other in setting screens and report printing. In the example illustrated in FIG. 6A, "LAN1" is set. Although omitted due to the limited space of the drawing, other settings including proxy server settings, Dynamic Host Configuration Protocol (DHCP) server settings, and IP address settings can be also made on the setting screen 600 illustrated in FIG. 6A. When the network setting control unit 1040 detects selection of an Enter key, the network setting control unit 1040 changes the setting value in the setting value DB 1050, based on the setting value set via the setting screen.

Return to the description of FIG. 2. In a case where the automatic acquisition of the DNS server is enabled, a DNS server automatic acquisition unit 1070 acquires the DNS server settings from the network. The DNS server automatic acquisition unit 1070 includes a DHCP client. The DHCP client of the DNS server automatic acquisition unit 1070 transmits a request including a DHSP option for requesting the DNS server on the network for the address of the DHCP server and then acquires the IP address of the DNS server. In a case where IPv6 is employed as a protocol stack, the DHCP client can acquire the IP address of the DNS server based on correspondence between Router Solicitation (RS) and Router Advertisement (RA).

FIGS. 7A and 7B illustrate examples of setting values stored in the setting value DB 1050. FIG. 7C illustrates an example of a setting file generated in control (described below). FIG. 7A illustrates an example of the IP address of the DNS server manually set via the setting screen 600 and stored in the setting value DB 1050, and an example of the IP address of the DNS server acquired in the automatic acquisition. FIG. 7B illustrates an example of the IP address of the DNS server manually set via the setting screen 610 and stored in the setting value DB 1050, and an example of the IP address of the DNS server acquired in the automatic acquisition. These setting values are referred to in each piece of processing illustrated in the flowchart (described below) as appropriate.

Return to the description of FIG. 2. The DNS cache server 1030 is a cache server that receives a query of name resolution from the DNS client 1021, makes a query by proxy to the DNS server managing the host name and domain name, and transmits the result as a response to the DNS client 1021. The result of the query is cached for a predetermined period of time. The DNS cache server 1030 has a function of returning the cached result without making a new query to the external server in a case where name resolution for the same host name is requested within the predetermined period of time.

In a case where only one communication interface is enabled or used for data transmission, the network setting control unit 1040 specifies as a query destination the DNS server assigned to Network 1 that functions as the primary network. That is, the network setting control unit 1040 specifies as a query destination the IP address illustrated in FIG. 7A. The network setting control unit 1040 further performs control not to activate the DNS cache server 1030 for a purpose of restraining the hardware resources and memory resources from being wasted.

On the other hand, in a case where both Networks 1 and 2 are enabled and used for data transmission, the network setting control unit 1040 performs control to activate the DNS cache server 1030. Further, the network setting control unit 1040 changes the query destination for the DNS client 1021 of the OS 1020 to the DNS cache server 1030. That is, the network setting control unit 1040 sets the query destination for the DNS client to 127.0.0.1 that is the IP address of the internal loopback. This setting enables the DNS cache server 1030 to operate to ignore or cancel a request for name resolution from a DNS client other than the DNS client included in the MFP 200.

For implementation of the DNS cache server 1030, Berkley Internet Name domain (BIND) (https://www.isc.org/bind/) and Unbound (https://www.nlnetlabs.nl/projects/unbound/about/) can be used. The present exemplary embodiment will be described below based on an example case where Unbound is employed as the DNS cache server.

The present exemplary embodiment focuses on a point that the DNS cache server 1030 can register transfer conditions for making a recursive query to the other DNS server. The network of the query destination of the DNS server is differentiated by utilizing the transfer conditions.

A method for registering a domain for which query is desired to be made to the DNS server of network 2 will be described below with reference to the setting screen 610 illustrated in FIG. 6B.

The setting screen 610 is a setting screen for accepting settings for Network 2 that functions as the sub network. Settings of the DNS server displayed in display items 611 to 613 are similar to those displayed in the display items 601 to 603 in the setting screen 600, and redundant descriptions thereof will be omitted. The setting screen 610 indicates an example case where the IP address of the DNS server on Network 2 is automatically acquired, and the acquired IP address is set as a DNS server to be used on Network 2. An area 618 is a display item for setting a name (nickname) of Network 2 like the area 604. In this example case, "Internet" is set as the name of Network 2.

Further, the user can make a setting for registering a domain name for which a name resolution request is to be made to the DNS server of Network 2 via the setting screen 610 of Network 2 functioning as the sub network. An area 616 is a display item for presenting the registered domain name to the user. By performing a touch operation on the area 616, the user can select a row corresponding to one of the registered domain names.

A Register New Domain key 614 is a display item used to register a new domain name for which a name resolution request is to be made to the DNS server of Network 2. An Edit key 615 is a display item used to edit a registered domain name selected by a touch operation on the area 616. A message 617 is a display item for explaining the function to the user. More specifically, the message 617 includes a message notifying the user that name resolution using the DNS server of Network 2 is enabled by pre-registering the domain names of the servers on the network. The message 617 further includes a warning message indicating that name resolution for a host name managed with an unregistered domain is requested to Network 1 (LAN1). Displaying the message 617 allows the user to intuitively and easily understand what the function is for and what can occur if the settings are not made. An Enter key 619 is used to apply the settings made via the setting screen 610 to the setting value DB 1050. A Return key is used to discard the settings made via the setting screen 610 and end the setting process.

When the network setting control unit 1040 detects selection of the Register New Domain key 614, the network setting control unit 1040 displays a setting screen including a text box for accepting an input of a domain name. The user inputs a domain name in the text box and then performs an operation for registering the domain name via the setting screen. Upon detection of the registration operation, the network setting control unit 1040 updates the domain list stored in the setting value DB 1050, i.e., a list of domains for which name resolution request is to be made to the DNS server of Network 2. The updated domain list will be referred to in the flowcharts of setting processing (described below) as appropriate.

Figure 4:
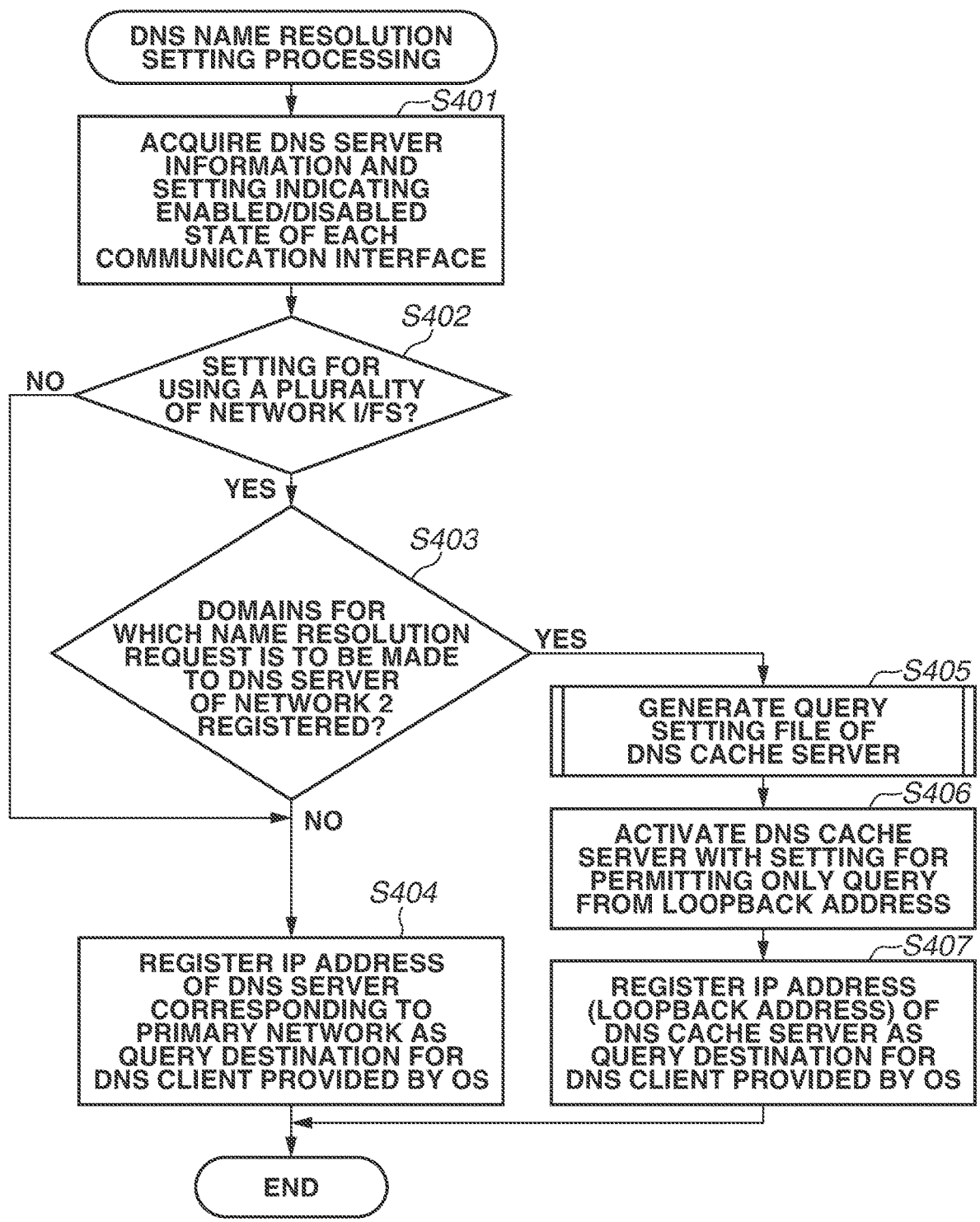
FIG. 4 is a flowchart illustrating an example of MFP control.

Specific control will be described below with reference to FIGS. 4, 5A, and 5B. Operations (steps) illustrated in FIGS. 4, 5A, and 5B are implemented when the CPU 202 loads a program for implementing each control module stored in the ROM 204 or the storage 205 into the RAM 203 and then executes the program. The CPU 202 implements data transmission and reception processing in collaboration with each communication interface. In a case where the entity that performs the processing is to be clarified, a description will be given by using the software module executed by the CPU 202 as the subject.

The flowchart illustrated in FIG. 4 describes activation processing performed by the MFP 200 to make a transition from a power OFF state to a standby state upon acceptance of an operation for activating the MFP 200 in the power OFF state. Although, in the activation processing, not only the setting processing related to the network but also other activation processing (including preparing a screen to be displayed on the operation panel 211 and processing for activating various hardware components) are also performed in a parallel or sequential manner, descriptions of these pieces of processing will be omitted.

In step S401, the network setting control unit 1040 acquires information about the DNS server and setting information indicating an enabled/disabled state of each communication interface from the setting value DB 1050. The information about the DNS server includes DNS server settings for each communication interface, and the domain list stored in association with the sub network.

In step S402, the network setting control unit 1040 determines whether a setting for using a plurality of network interfaces is made, based on the setting information acquired in step S401. In a case where the network setting control unit 1040 determines that the setting for using a plurality of network interfaces is made (YES in step S402), the processing proceeds to step S403. On the other hand, in a case where the network setting control unit 1040 determines that setting for using a plurality of network interfaces is not made (NO in step S402), the processing proceeds to step S404. More specifically, in a case where a setting for enabling only either one of Networks 1 and 2 is made, the network setting control unit 1040 determines that the setting for using a plurality of network interfaces is not made. In a case where a setting for enabling both Networks 1 and 2 is made, the network setting control unit 1040 determines that the setting for using a plurality of network interfaces is made.

In step S403, the network setting control unit 1040 determines whether domains for which a name resolution request is to be made to the DNS server of Network 2 are registered, based on the DNS server settings acquired in step S401. In a case where one or more domain names are registered in the domain list, the network setting control unit 1040 determines that domains for which the name resolution request is to be made to the DNS server of Network 2 are registered (YES in step S403). Then, the processing proceeds to step S405. On the other hand, in a case where one or more domain names are not registered in the domain list, the network setting control unit 1040 determines that domains for which the name resolution request is to be made to the DNS server of Network 2 are not registered (NO in step S403). Then, the processing proceeds to step S404.

In step S404, the network setting control unit 1040 registers the IP address of the DNS server corresponding to the primary network as a DNS server that is the query destination for the DNS client 1021. For example, if the OS 1020 is Linux, the network setting control unit 1040 edits the setting file located at "/etc/resolve.conf" and changes the setting such that the IP address of the DNS server corresponding to the primary network is the query destination. Subsequently, the network setting control unit 1040 requests the OS 1020 to activate the DNS client 1021. The OS 1020 activates the DNS client 1021 in response to the request. The activated DNS client 1021 refers to the setting file and reads the DNS server as the query destination for the name resolution request. In a case where only one communication interface is used, the processing in step S404 enables the DNS server on the network, to which an enabled communication interface is connected, to be suitably set to the DNS client 1021 without activating the DNS cache server. Even in a case of using a plurality of communication interfaces, if the domain list for the sub network is unregistered, the processing in step S404 enables the DNS server for the primary network to be suitably set to the client without activating the DNS cache server.

In step S405, the network setting control unit 1040 generates a query setting file to be used by the DNS cache server. Specific processing will be described below with reference to FIG. 5A.

Here, a description will be given centering on an example case where Network 1 is the communication interface that functions as the primary network, and Network 2 is the communication interface that functions as the sub network.

In step S501, the network setting control unit 1040 acquires the DNS server settings for Network 2 and the domain list for Network 2. Upon completion of the acquisition, the CPU 202 sets reference information to be used for accessing the domain list at the top of the domain list. In step S502, the network setting control unit 1040 reads one domain name existing in the domain list, and adds, to the setting file, a rule for transferring the name resolution request for the host name belonging to the domain name to the DNS server of network 2.

In step S503, the network setting control unit 1040 determines whether the end of the domain list is reached. In a case where the network setting control unit 1040 determines that the end of the domain list is reached as a result of the reading in step S502 (YES in step S503), the processing proceeds to step S504. On the other hand, in a case where the network setting control unit 1040 determines that the end of the domain list is not reached (i.e., the domain list includes a domain name for which the processing for adding the rule has not been performed) (NO in step S503), the network setting control unit 1040 updates the reference information indicating the list to be read in step S502. Then, the processing returns to step S502.

In step S504, the network setting control unit 1040 acquires the DNS server settings for Network 1 that functions as the primary network.

In step S505, the network setting control unit 1040 adds the rule for transferring the name resolution request for a domain not satisfying the added rule to the DNS server of Network 1, and updates the setting file of the DNS cache server. Upon completion of the update of the setting file, the processing proceeds to step S406.

FIG. 7C illustrates a specific example of the setting file set in the flowchart illustrated in FIG. 5A. FIG. 7C illustrates an example of the setting file. As described above, FIGS. 7A and 7B illustrate the IP address of the DNS server assigned to each communication network.

FIG. 7C illustrates an example case where the DNS cache server is Unbound. In this case, the setting file (forward-zone.conf) of the DNS cache server is as illustrated in FIG. 7C. The definitions of the settings illustrated in FIG. 7C will be described below. The character string "forward-zone" indicates that a transmission destination is specified. In Unbound, when name resolution for the host name belonging to the domain specified by the name of the forward-zone is requested by the client, the network setting control unit 1040 transfers the name resolution to the DNS server specified by forward-addr.

A setting where "." is specified by the name of the forward-zone is a setting for requesting a predetermined DNS server for name resolution. In Unbound, when name resolution for the host name belonging to a self-unresolvable domain is requested by the client, the network setting control unit 1040 transfers the name resolution to the DNS server specified by forward-addr associated with ".".

For example, in a case where "example.org" and "test.org" illustrated in the setting screen 610 are specified in the domain name for which a query is to be made to the DNS server of Network 2, a setting 710 is generated by the processing in steps S502 to S503. The setting 710 indicates a rule for transferring name resolution for the host name belonging to the domain set in the setting screen 610 to the DNS server illustrated in FIG. 7B.

The processing in step S505 generates a setting 720 for transferring name resolution for a host name not belonging to a specific domain to the DNS server of Network 1 as the primary network.

Return to the description of FIG. 4. In step S406, the network setting control unit 1040 activates the DNS cache server 1030 based on a setting for permitting only a name resolution request from a loopback address 127.0.0.1. The DNS cache server 1030 that is instructed to activate refers to the setting file generated in the processing illustrated in FIG. 5A and loads a route table for determining a transmission destination of the name resolution into the RAM 203. That is, when the DNS cache server 1030 is activated, the DNS cache server 1030 makes operation settings based on the setting file. The activated DNS cache server 1030 performs control to differentiate the query destination based on the operation settings.

In step S407, the network setting control unit 1040 registers the IP address of the DNS cache server as the query destination DNS server for the DNS client 1021 provided by the OS 1020. For example, if the OS 1020 is Linux, the network setting control unit 1040 edits the setting file located at "/etc/resolve.conf" and changes the name resolution request destination to the IP address (loopback address) setting of the DNS cache server. Subsequently, the network setting control unit 1040 requests the OS 1020 to activate the DNS client 1021. The OS 1020 activates the DNS client 1021 in response to the request. The activated DNS client 1021 refers to the changed setting file and determines to use the internal DNS cache server as the query destination DNS server for the name resolution request.

When the processing in either one of steps S404 and S407 is performed, the setting processing for DNS is completed, and other activation processing performed in a parallel or sequential manner is also completed, the CPU 202 then completes the series of activation processing. When the activation processing is completed, the MFP 200 enters the standby state, i.e., a state where the above-described print function, scan function, management function, and cloud print function can be used.

Name resolution control by the DNS cache server 1030 will be described below with reference to FIG. 5B.

The flowchart illustrated in FIG. 5B is performed when the DNS client 1021 of the OS 1020 that has received a name resolution request from each application requests the DNS cache server 1030 for name resolution.

In step S510, the DNS cache server 1030 determines whether the cache corresponding to the name resolution request received from the DNS client 1021 exists. In a case where the cache exists (YES in step S510), the processing proceeds to step S511. On the other hand, in a case where the cache does not exist (NO in step S510), the processing proceeds to step S515.

In step S511, the DNS cache server 1030 determines whether the domain name included in the received name resolution request satisfies the transfer conditions. The DNS cache server 1030 determines whether the received request is a name resolution request to be transferred to a specific DNS server based on the route table for determining the transmission destination of name resolution loaded into the RAM 203. In a case where the DNS cache server 1030 determines that the received request is a name resolution request to be transferred to a specific DNS server (YES in step S511), the processing proceeds to step S512. On the other hand, in a case where the DNS cache server 1030 determines that the received request is not a name resolution request to be transferred to a specific DNS server (NO in step S511), the processing proceeds to step S513. More specifically, in a case where an upper-level domain configuring the host name for the name resolution request coincides with the domain name in the setting 710 illustrated in FIG. 7C, the received request is determined to be a name resolution request to be transferred to a specific DNS server.

In step S512, the DNS cache server 1030 transfers name resolution to the DNS server that satisfies the transfer conditions in collaboration with the communication I/F. In step S513, the DNS cache server 1030 transfers name resolution to the predetermined DNS server (i.e., the DNS server assigned to the communication interface that functions as the primary network) in collaboration with the communication I/F.

In step S514, the DNS cache server 1030 determines whether a result of the transferred name resolution is received from the DNS server. When the result is received (YES in step S514), the processing proceeds to step S515. On the other hand, the result is not received (NO in step S514), the processing returns to step S514.

In step S515, the DNS cache server 1030 notifies the DNS client 1021 of the result of the name resolution. The DNS cache server 1030 also registers the result as a cache. In a case where the DNS cache server 1030 determines that the cache exists (YES in step S510), the result of the name resolution is notified based on the cache. In this case, the cache is not registered. Upon reception of the result, the DNS client 1021 notifies the application that has requested for the name resolution of the result of the name resolution. The application communicates with an external apparatus by using the IP address obtained as the result of the name resolution.

As described above, the correspondence between the domain name and the DNS server as a query destination is registered in the DNS cache server by using the setting file in the present exemplary embodiment. This makes it possible to differentiate the DNS server subjected to name resolution by utilizing the DNS cache server.

Although, in the present exemplary embodiment, the DNS cache server 1030 caches the result of the name resolution, the cache may be controlled not to be utilized. In this case, the DNS cache server 1030 can skip the processing in step S510 and the cache processing in step S515.

Although the present exemplary embodiment has been described above centering on an example case where the MFP 200 includes two different communication interfaces, the MFP 200 may include three or more different communication interfaces. In this case, only one of the communication interfaces functions as the primary network, and the other communication interfaces function as the sub networks. In this case, the MFP 200 provides a function of making similar settings to those of the name resolution illustrated as example in FIG. 6B in association with each communication interface that functions as the sub network. The MFP 200 further performs the processing in steps S501 and S503 the number of times equal to the number of communication interfaces that function as the sub networks. This processing enables the name resolution to be performed appropriately for three or more communication interfaces. The communication interface that functions as the primary network may be determined at the time of factory shipment. Alternatively, which communication interface is to function as the primary network may be set as an operation setting of the MFP 200 via a user operation.

Second Exemplary Embodiment

The first exemplary embodiment has been described above centering on a method for updating the domain list by receiving a user operation for registering a domain name subjected to name resolution in a DNS server of Network 2.

A second exemplary embodiment will be described below centering on, in addition to the processing according to the first exemplary embodiment, a mechanism for confirming whether name resolution can be performed at the timing of reception of the user operation for registration. A hardware configuration according to the second exemplary embodiment is similar to that according to the first exemplary embodiment, and redundant descriptions thereof will be omitted.

Figure 8:
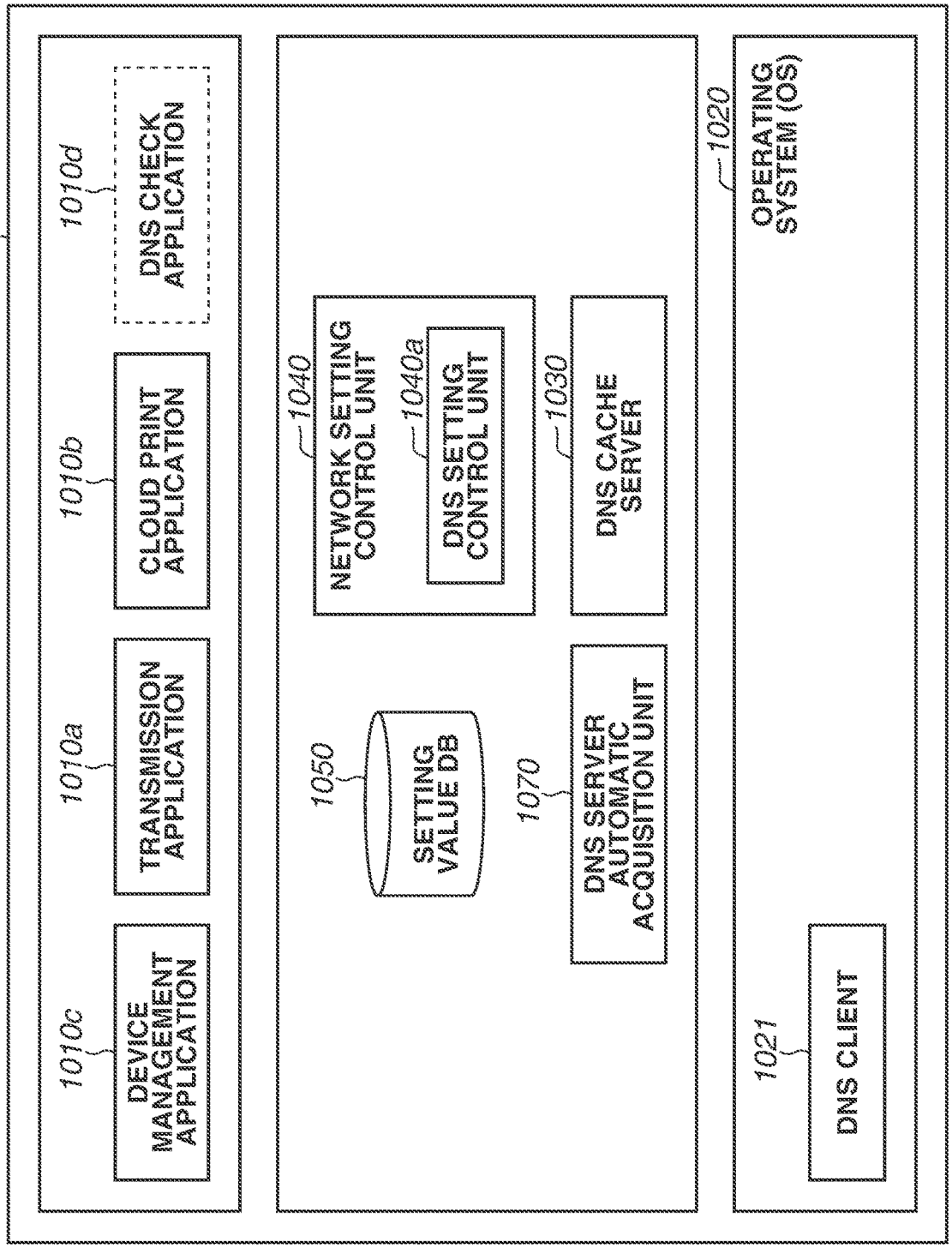
FIG. 8 is a diagram illustrating an example of a software configuration of an MFP according to a second exemplary embodiment.

A software configuration according to the second exemplary embodiment will be described below with reference to FIG. 8. The configuration illustrated in FIG. 8 differs from that illustrated in FIG. 2 in that a DNS check application 1010d is added.

The DNS check application 1010d is an application that requests a specified DNS server for name resolution for a specified domain name. For example, the DNS check application 1010d requests the OS 1020 for forward lookup of a domain by using a nslookup command, in which the name of a DNS server desired to be requested for name resolution is specified as an option. The OS 1020 requests the DNS server for name resolution.

Figure 9:
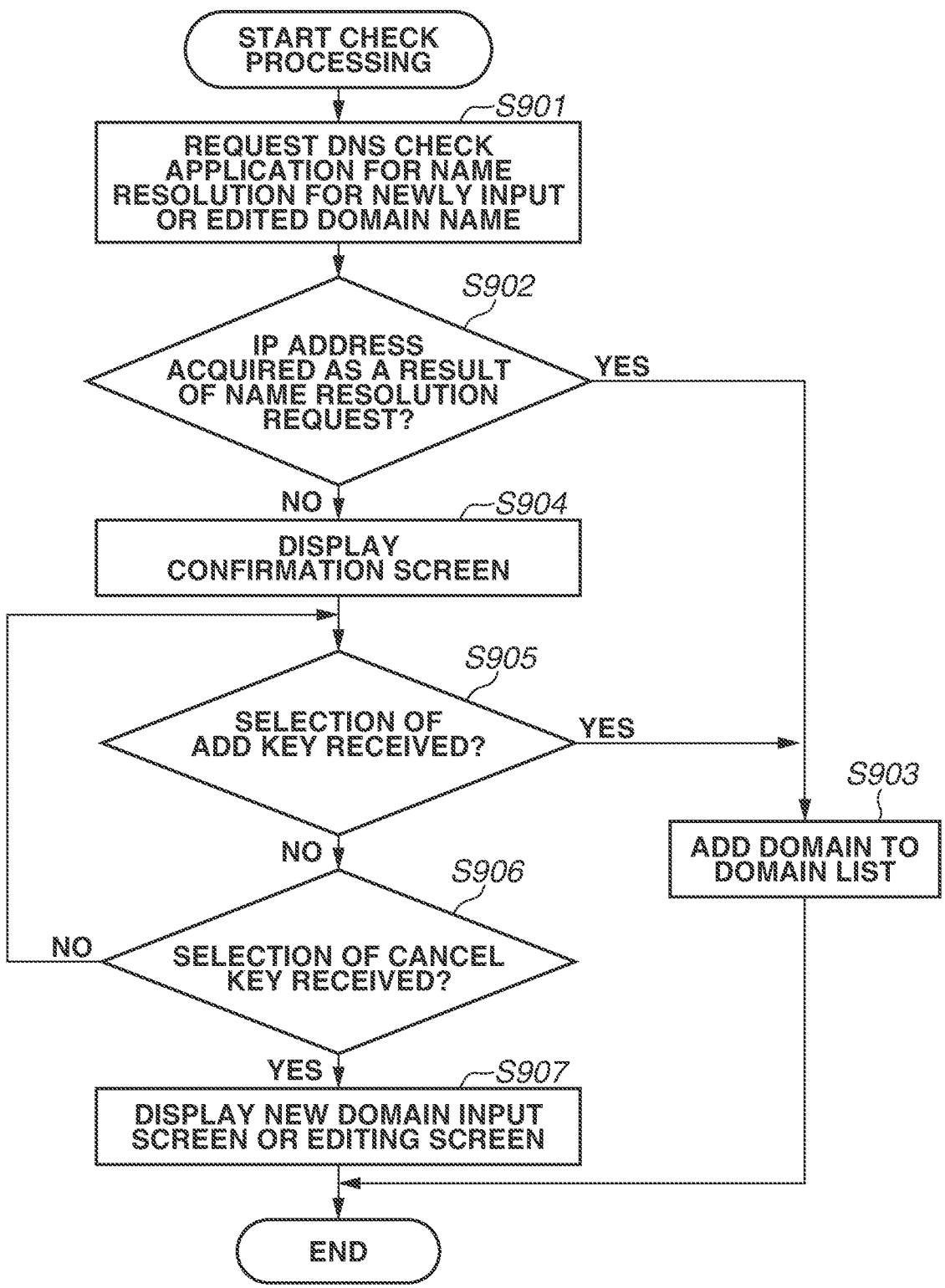
FIG. 9 is a flowchart illustrating an example of MFP control according to the second exemplary embodiment.

Specific control will be described below with reference to FIGS. 9, 10A, and 10B. Operations (steps) illustrated in FIG. 9 are implemented when the CPU 202 loads a program for implementing each control module stored in the ROM 204 or the storage 205 into the RAM 203 and then executes the program. The CPU 202 implements data transmission and reception processing in collaboration with each communication I/F. In a case where the entity that performs the processing is to be clarified, a description will be given by using the software module executed by the CPU 202 as the subject.

Figure 10A:
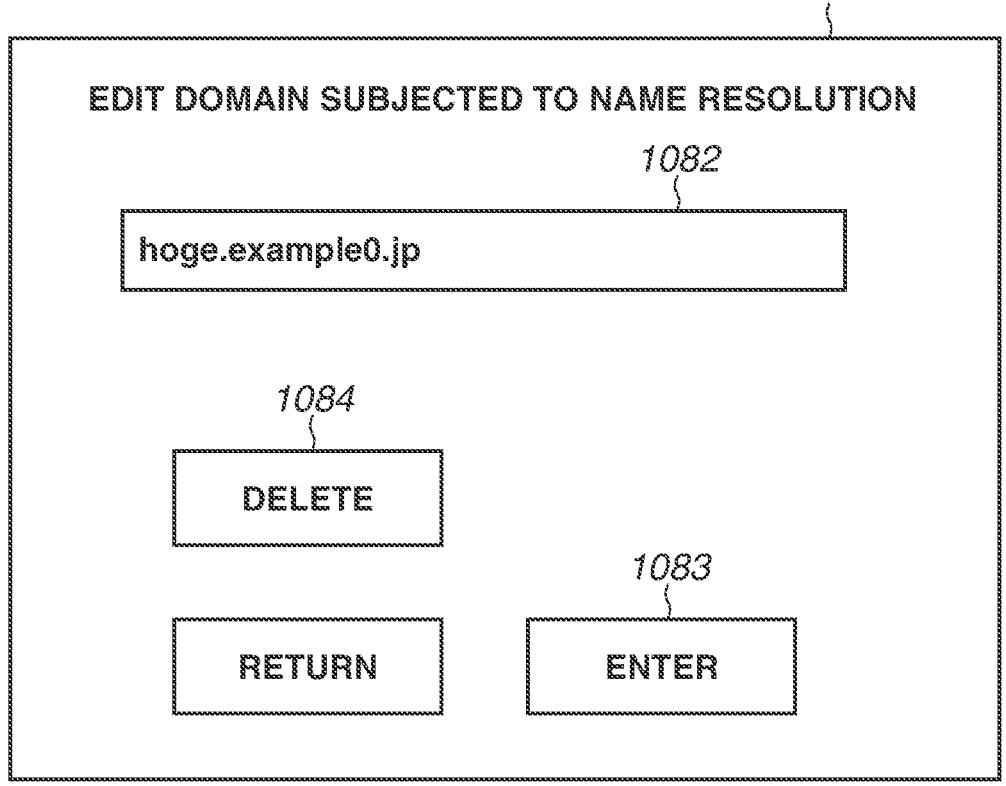
FIG. 10A is a diagram illustrating an example of a setting screen related to a network according to the second exemplary embodiment.
Figure 10B:
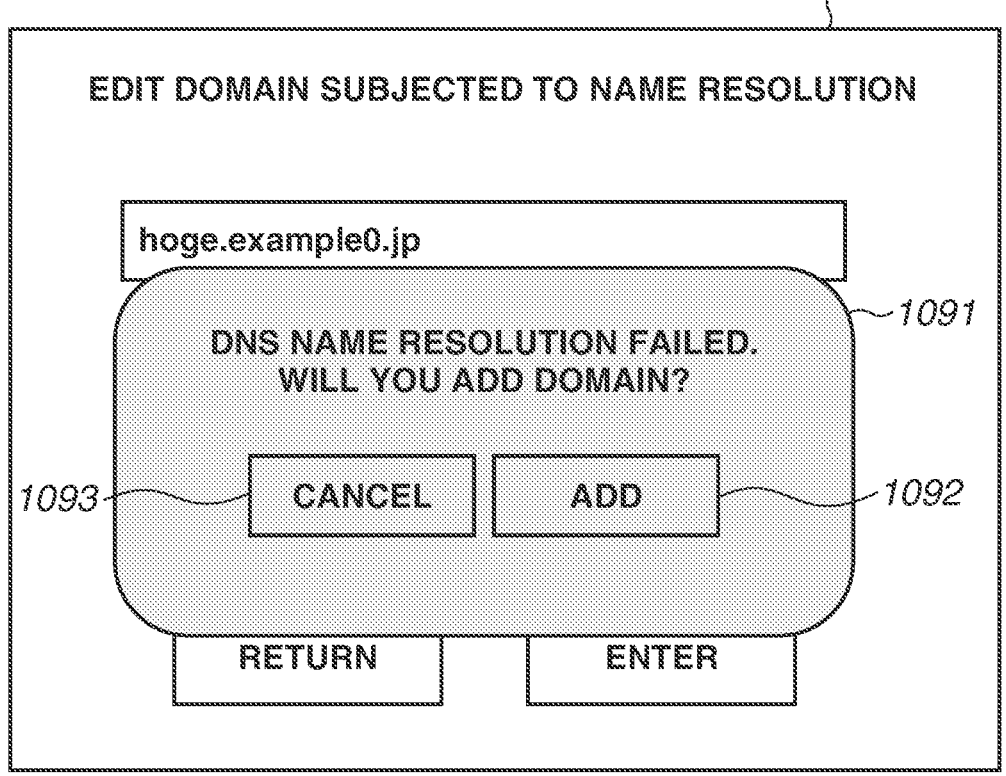
FIG. 10B is a diagram illustrating an example of a confirmation screen related to the network according to the second exemplary embodiment.

FIGS. 10A and 10B illustrate examples of setting screens according to the second exemplary embodiment. A screen 1080 illustrated in FIG. 10A is an example of a screen displayed when the Edit key 615 or the Register New Domain key 614 is selected via the setting screen 610 according to the first exemplary embodiment.

A text box 1082 is a display item used by the user to input a domain name. Upon detection of an operation for selecting the display item 1082, the network setting control unit 1040 displays a software keyboard (not illustrated) and accepts an input of a domain name via the keyboard. The screen 1080 indicates an example case where an input of "hoge.example0.jp" is accepted as a domain name.

An Enter key 1083 is used to register the domain name. The Return key is used to cancel settings made via the screen 1080 and to return to a network setting screen as illustrated in the setting screen 610. A Delete key 1084 is displayed in an editing screen. The user can delete a registered domain via the Delete key 1084. The Delete key 1084 is not displayed in a new registration screen.

When the network setting control unit 1040 receives an input of a domain name and then detects selection of the Enter key 1083, the network setting control unit 1040 performs each piece of processing in the flowchart illustrated in FIG. 9.

In step S901, the network setting control unit 1040 notifies the DNS check application 1010d of the domain name input via the screen 1080 and an IP address indicating the DNS server subjected to name resolution. In other words, the network setting control unit 1040 requests the DNS check application 1010d for name resolution. The DNS check application 1010d requests the OS 1020 for forward lookup using a nslookup command based on the notified information. The OS 1020 then requests the DNS server specified in an optional command for name resolution in collaboration with the DNS client 1021 and the communication interfaces. A result of the name resolution for the specified DNS server is notified to the DNS check application 1010d.

In step S902, the network setting control unit 1040 receives the result of the name resolution from the DNS check application 1010d, and determines whether the IP address has been acquired based on the received result. In a case where the IP address corresponding to the domain name has been acquired (YES in step S902), the processing proceeds to step S903. On the other hand, in a case where the IP address has not been acquired (NO in step S902), the processing proceeds to step S904.

In step S903, the network setting control unit 1040 adds the domain name that corresponds to the IP address acquired by the name resolution to the domain list stored in the DB 1050.

In step S904, the network setting control unit 1040 displays a confirmation screen. A screen 1090 illustrated in FIG. 10B is an example of the confirmation screen. A pop-up 1091 displays display items corresponding to the pop-up for presenting information to the user. The pop-up 1091 includes a message indicating that name resolution has failed and a message for confirming whether the user desires to add the domain name that has failed in the name resolution. An Add key 1092 is used to add the domain name that has failed in the name resolution. A Cancel key 1093 is used to cancel the addition of the domain name that has failed in the name resolution.

Return to the description of FIG. 9. In step S905, the network setting control unit 1040 determines whether selection of the Add key 1092 is accepted. In a case where the selection of the Add key 1092 is accepted (YES in S905), the processing proceeds to step S903. On the other hand, in a case where the selection of the Add key 1092 is not accepted (NO in step S905), the processing proceeds to step S906.

In step S906, the network setting control unit 1040 determines whether selection of the Cancel key 1093 is accepted. In a case where the selection of the Cancel key 1093 is accepted (YES in step S906), the processing proceeds to step S907. On the other hand, in a case where the selection of the Cancel key 1093 is not accepted (NO in step S906), the processing returns to step S905. Then, the network setting control unit 1040 waits for selection of a key by the user.

In step S907, the network setting control unit 1040 changes the screen displayed on the operation panel 211 to a new input screen or an editing screen. The screen is assumed to be a screen where an unregistered domain name is preset like the screen 1080. However, the configuration is not limited thereto. The text box of the domain name may be blank. In addition, on the screen 1080, the color of the text box of the domain name may be changed to light pink, and a message for promoting the user to correct the domain name may be displayed.

According to the above-described exemplary embodiment, in registering a correspondence between a domain name and a query destination DNS server, it is possible to prevent registration of a combination on which name resolution cannot be executed due to an incorrect input of the domain name. At present, in consideration of a case where a domain name not participating in a network is pre-input to the MFP 200, a combination on which name resolution cannot be executed can be also registered if the user explicitly instructs to add the domain name via the confirmation screen. The configuration allows the user such as the administrator to perform flexible pre-registration processing while preventing a setting error due to an incorrect input.

Third Exemplary Embodiment

If there are many domain names to be inquired of the DNS server of the sub network, it takes time and effort to perform pre-registration processing by manually inputting one domain name according to the first exemplary embodiment. A third exemplary embodiment provides a function of collectively importing domain names, in addition to the control described in the first exemplary embodiment.

A screen 1100 illustrated in FIG. 11 is a setting screen related to a communication interface that functions as the sub network according to the third exemplary embodiment. The screen 1100 is displayed instead of the setting screen 610 illustrated in FIG. 6B according to the first exemplary embodiment.

The difference of the screen 1100 from the setting screen 610 is that an Import key 1101 is added. The user can select a file (e.g., a file in Comma Separated Value (CSV) format) that enumerates domain names by using the Import key 1101.

Figure 12:
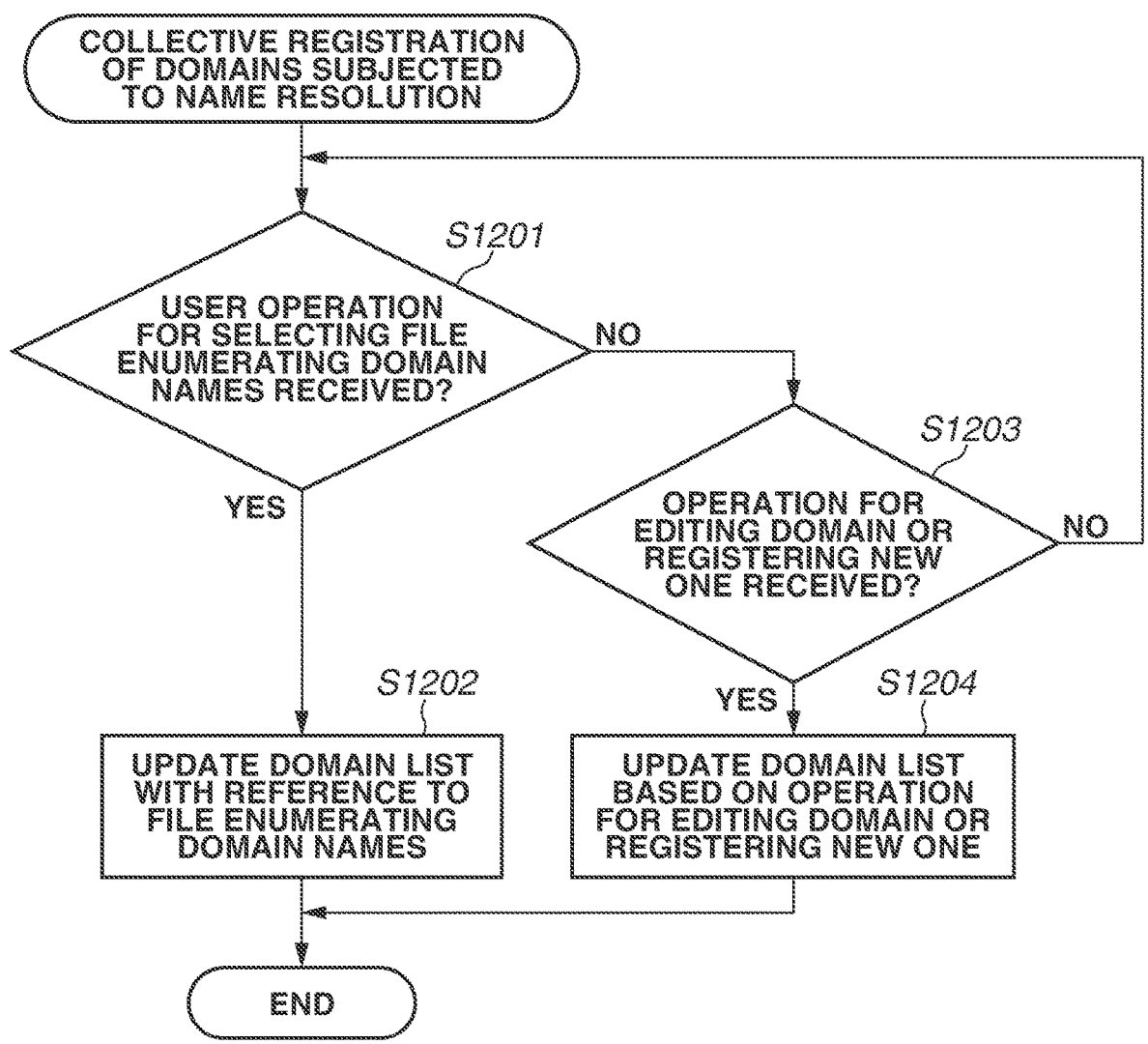
FIG. 12 is a flowchart illustrating an example of MFP control according to the third exemplary embodiment.

Specific control will be described below with reference to FIG. 12. Operations (steps) illustrated in FIG. 12 are implemented when the CPU 202 loads a program for implementing each control module stored in the ROM 204 or the storage 205 into the RAM 203 and then executes the program. The CPU 202 implements data transmission and reception processing in collaboration with each communication interface. In a case where the entity that performs the processing is to be clarified, a description will be given by using the software module executed by the CPU 202 as the subject.

In step S1201, the network setting control unit 1040 determines whether a user operation for selecting a file enumerating domain names is received. For example, the user generates a CSV file enumerating domain names by using a PC, and stores the file in a Universal Serial Bus (USB) memory. Then, the user attaches the USB memory storing the file to a USB port (not illustrated) of the MFP 200. The CPU 202 mounts the attached USB memory as an external storage. Subsequently, upon detection of selection of the Import key 1101, the network setting control unit 1040 obtains a selection screen for file selection from the mounted external storage and displays the selection screen on the operation panel 211. When a file enumerating domain names is selected via the selection screen, the network setting control unit 1040 determines that a user operation for file selection is accepted. In a case where a user operation for selecting a file enumerating domain names is accepted (YES in step S1201), the processing proceeds to step S1202. On the other hand, in a case where a user operation for selecting a file enumerating domain names is not accepted (NO in step S1201), the processing proceeds to step S1203.

In step S1202, the network setting control unit 1040 updates the domain list in the setting value DB 1050 with reference to the file enumerating domain names. In step S1203, the network setting control unit 1040 determines whether an operation for editing a domain name or registering a new one is accepted. In a case where an operation for editing a domain name or registering a new one is accepted (YES in step S1203), the processing proceeds to step S1204. On the other hand, in a case where an operation for editing a domain name or registering a new one is not accepted (NO in step S1203), the network setting control unit 1040 waits for a user operation via a setting screen.

In step S1204, the network setting control unit 1040 updates the domain list in the setting value DB 1050 based on the operation for editing a domain name or registering a new one. When the processing in step S1202 or S1204 is completed, the network setting control unit 1040 completes the series of processing.

This processing enables domain names to be collectively imported, thereby further improving the convenience for the administrator. The updated domain list is referenced when the processing of the flowchart illustrated in FIG. 5A is executed and is used to control the setting file generation.

Although the present exemplary embodiment has been described above centering on an example case where a file enumerating domain names is acquired via a USB memory, the configuration is not limited thereto. For example, in a case where a web screen as illustrated in FIG. 11 is provided to the web browser of the client terminal, the following control can be performed. Specifically, instead of the processing in step S1201, control is performed to determine whether a file enumerating domain names is received from the client.

The network setting control unit 1040 generates web content including form parts for file upload as web content corresponding to the screen 1100 illustrated in FIG. 11, and transmits the generated web content to the client. On the client, a web screen including a file upload button is displayed based on the web content including form parts. If the user performs a user operation for uploading a file on the web browser, the web browser of the client transmits a HTTP request for file upload to the MFP 200. Upon reception of the HTTP request, the network setting control unit 1040 determines that a file enumerating domain names is received from the client. In step S1202, the network setting control unit 1040 updates the domain list in the setting value DB 1050 with reference to the received file enumerating domain names.

Although the present exemplary embodiment has been described above centering on an example case where processing of the import function is performed in addition to the processing according to the first exemplary embodiment, the configuration is not limited thereto. For example, the import function may be added to the configuration according to the second exemplary embodiment. In this case, the check processing described above with reference to FIG. 9 is performed between steps S1203 and S1204. Further, the MFP 200 performs the check processing illustrated in FIG. 9 on each domain name included in the file enumerating domain names and then determines whether to add a new domain name to the domain list depending on the result of the check processing. Even when domain names are collectively imported, this processing can prevent an unintended domain name from being pre-registered due to an incorrect input of a domain name by the administrator.

Fourth Exemplary Embodiment

The above-described exemplary embodiments are based on an example case where domain names are input by the user such as the administrator. A fourth exemplary embodiment considers control in a case where the user such as the administrator explicitly associates the functions of the MFP 200 with the communication interfaces to be used for communication, in addition to the control according to the first exemplary embodiment.

Figures 13A, 13B, 13C:
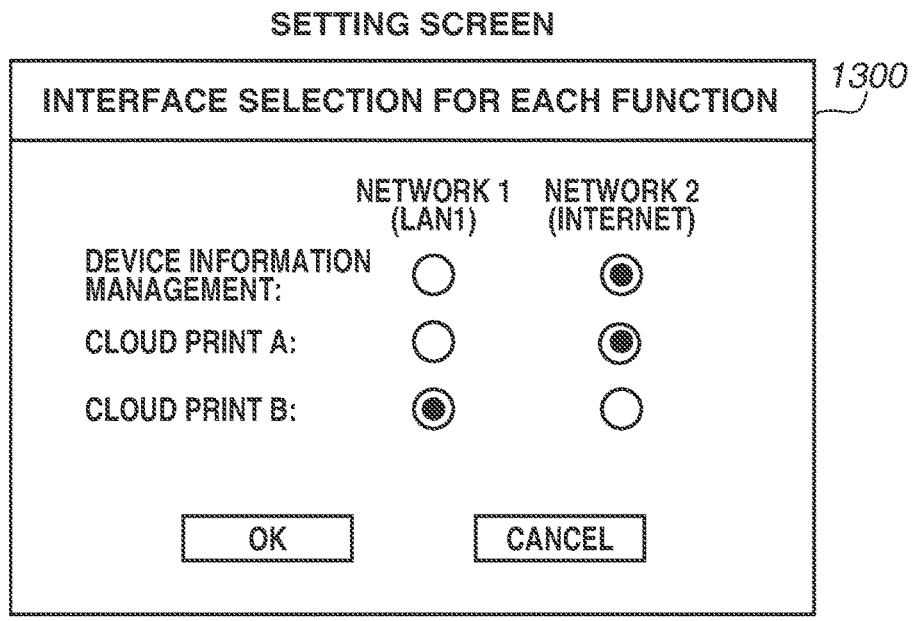
FIG. 13A is a diagram illustrating an example of a setting screen for setting a correspondence relationship between a function offered by an MFP and an interface to be used for communication according to a fourth exemplary embodiment.
FIG. 13B is a diagram illustrating a list of host names of external servers with which each function communicates, that are stored in the setting value DB, according to the fourth exemplary embodiment.
FIG. 13C illustrates an example of a setting file according to the fourth exemplary embodiment.

FIGS. 13A to 13C illustrate the fourth exemplary embodiment. FIG. 13A illustrates an example of a setting screen for setting, as a set communication interface correspondence, a correspondence between a function provided by the MFP 200 and an interface to be used for communication. The user can pre-register a communication interface to be used by each function to communicate with the outside via the setting screen. For example, to enable a device information management function provided by the device management application 1010c and the management server, communication may be desired to be performed with the management server via Network 2 as the sub network. In this case, the user such as the administrator sets Network 2 (Internet) as a communication interface to be used by the device information management function. Likewise, to enable a predetermined cloud print function, communication may be desired to be performed with a cloud print server via Network 2 as the sub network. In this case, the user such as the administrator sets Network 2 (Internet) as the communication interface to be used by the cloud print function of a predetermined type (e.g., cloud print A). The setting values set via the screen illustrated in FIG. 13A are stored in the setting value DB 1050 as interface settings for each function.

In each function illustrated in FIG. 13A, processing for transmitting data and processing for making a job query to an external server or a cloud server occurs. FIG. 13B illustrates a list of host names of external servers with which each function stored in the setting value DB 1050 communicates. For example, it is predetermined that the device information management function communicates with a server identified by a host name, "printer_mainenance.example3.jp". It is predetermined that cloud print A communicates with a server identified by a host name, "cloudprinterabc.example4.jp". It is also determined that cloud print B communicates with a server identified by a host name, "cloudprinterdef.example5.jp". Although the present exemplary embodiment has been described above centering on an example case where one host name is associated with one function, the configuration is not limited thereto. In a case where one function communicates with a plurality of external apparatuses, a plurality of host names may be associated with one function. In addition, each server identified by a plurality of host names may belong to different domains.

Depending on the function provided by the MFP 200, a host name of the communication destination and a domain to which an external server identified by the host name belongs are determined in advance. At this time, if a name resolution request for the host name of the external server is also made to a DNS server on the network in which the communication interface specified for each function participate, time and effort taken for pre-registration can be further reduced.

The fourth exemplary embodiment will be described below centering on a mechanism for identifying the DNS server to be used for name resolution for the host name based on the settings illustrated in FIGS. 13A to 13C, and automatically registering a communication interface correspondence between the domain name and the query destination DNS server. Specific control will be described below with reference to FIGS. 14 and 13C.

Operations (steps) illustrated in FIG. 14 are implemented when the CPU 202 loads a program for implementing each control module stored in the ROM 204 or the storage 205 into the RAM 203 and then executes the program. The CPU 202 implements data transmission and reception processing in collaboration with each communication interface. In a case where the entity that performs the processing is to be clarified, a description will be made by using the software module executed by the CPU 202 as the subject. The processing in the flowchart illustrated in FIG. 14 is performed instead of the file generation processing illustrated in FIG. 5A, and differs from the flowchart illustrated in FIG. 5A in that step S1410 is added after step S1401 (acquisition step).

In step S1401, the network setting control unit 1040 acquires the DNS server settings for Network 2 and the domain list for which the name resolution request is to be made to the DNS server of Network 2.

In step S1410, the network setting control unit 1040 refers to interface setting values for each function. Subsequently, the network setting control unit 1040 identifies a function to which Network 2 is specified as a communication interface to be used. Then, the network setting control unit 1040 acquires a host name stored in association with the identified function from the setting value DB 1050. The network setting control unit 1040 derives a domain name corresponding to the host name and adds the domain name to the domain list acquired in step S1401. For example, in a case where the settings illustrated in FIG. 13A are made, the network setting control unit 1040 adds "example4.jp" and "example3.jp" to the domain list based on the host names illustrated in FIG. 13B. When the network setting control unit 1040 completes the addition, the processing proceeds to step S1402. In steps S1402 to S1405, the network setting control unit 1040 performs processing for generating a transfer rule based on the domain list, similar to the processing in steps S502 to S505 according to the first exemplary embodiment. FIG. 13C illustrates an example of a setting file generated based on the processing in steps S1401, S1410, and S1402 to S1405. The setting file illustrated in FIG. 13C differs from the setting file illustrated in FIG. 7B in that a new setting 1320 is added. When this setting is read by the DNS cache server 1030, a name resolution request can be transferred to an appropriate DNS server.

In step S1410, the network setting control unit 1040 may be configured to register a host name in FQDN format to the domain list without identifying a lower-level domain name.

Although the fourth exemplary embodiment has been described above centering on an example case where automatic registration is performed according to settings in addition to the configuration according to the first exemplary embodiment, the present disclosure is not limited thereto. For example, automatic registration control can be combined with the MFP 200 having the import function according to the third exemplary embodiment. The check processing according to the second exemplary embodiment can be combined with the configuration according to the fourth exemplary embodiment. In this case, the network setting control unit 1040 only needs to perform the check processing illustrated in FIG. 9 according to the second exemplary embodiment upon acceptance of an operation for selecting the check box corresponding to Network 2 via the screen illustrated in FIG. 13A.

<Modifications>

Although the present exemplary embodiment has been described above centering on an example case where a setting file is generated at the time of activation, the configuration is not limited thereto. For example, the network setting control unit 1040 may generate the setting file upon acceptance of an operation for determining to change the settings via the screens 610, 1100, and 1300. In this case, the network setting control unit 1040 generates the setting file while displaying a screen indicating that the network settings are being changed on the operation panel 211. When the generation of the setting file is completed, the network setting control unit 1040 performs processing for reactivating the DNS client and the DNS cache server in collaboration with the OS 1020. Here, the reactivation processing may be a process for reactivating the entire MFP 200. According to the present modification, it is possible to reduce the calculation cost for generating a file each time the MFP 200 is activated, thereby reducing the activation time of the MFP 200.

As described in the exemplary embodiments, by registering a correspondence between a domain name and a query destination DNS server in a DNS cache server, the DNS cache server can suitably switch between DNS servers for which name resolution is to be executed based on the correspondence.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-235096, filed Dec. 25, 2019, which is hereby incorporated by reference herein in its entirety.

What is claimed is:

1. A communication apparatus to transmit data outside the communication apparatus via a plurality of different communication interfaces, the communication apparatus comprising:
at least one memory that stores instructions; and
at least one processor to execute the instructions to perform operations including:
setting, as a set communication interface correspondence, a communication interface correspondence between a domain name and a communication interface, from the plurality of different communication interfaces, wherein the set communication interface correspondence is to be used for communication with an external apparatus having an external apparatus host name and belonging to a domain identified by the domain name,
generating, based on the set communication interface correspondence, a setting indicating a Domain Name System name resolution server correspondence between the domain name and a Domain Name System (DNS) name resolution server to which name resolution for the external apparatus host name is to be transferred, and
activating a DNS cache server,
wherein the DNS cache server is configured to operate based on the generated setting,
wherein a DNS client, requested for the name resolution for the external apparatus host name by an application of the communication apparatus, transmits a request for the name resolution to the DNS cache server, and
wherein, based on a received host name included in the received request for the name resolution, the DNS cache server determines an external DNS server to which the name resolution is requested, and requests the determined external DNS server for the name resolution.

2. The communication apparatus according to claim 1, wherein, in a case where a first communication interface among the plurality of different communication interfaces is enabled in the communication apparatus and a second communication interface among the plurality of different communication interfaces, excluding the enabled first communication interface, is not enabled in the communication apparatus, the DNS cache server is not activated on the communication apparatus, and the DNS client requests a DNS server set for the enabled first communication interface for name resolution.

3. The communication apparatus according to claim 1, wherein the DNS cache server is configured to process a name resolution request transmitted through internal loopback, and is configured not to process a name resolution request from the outside of the communication apparatus.

4. The communication apparatus according to claim 1, wherein the operations further include:
accepting, in a case where the communication interface is set, an operation for registering the communication interface correspondence to be used for communication with the external apparatus belonging to the domain identified by the domain name,
requesting, in a case where the operation for registering is accepted, the DNS name resolution server and determining whether the name resolution is successful, and
displaying, upon failure of the name resolution, a display item for making an inquiry to a user about whether to register the domain name as the communication interface correspondence.

5. The communication apparatus according to claim 4, wherein the operations further include displaying a setting screen related to a first communication interface,
wherein the setting screen is configured such that an input operation for inputting an input domain name to be used for communication with a network external apparatus on a network via the first communication interface is acceptable via the setting screen, and
wherein the operation for registering the communication interface correspondence is accepted after accepting the input operation via the setting screen.

6. The communication apparatus according to claim 5, wherein the displayed display item is further for selecting a file, and the setting screen is further configured such that a user operation for selecting a file enumerating domain names is acceptable via the display item, and
wherein, in a case where the user operation for selecting the file is accepted, a correspondence between the domain names enumerated in the selected file and a communication interface to be used for communication with the external apparatus belonging to the domain identified by the domain name is set in the communication apparatus.

7. The communication apparatus according to claim 1, further comprising a scanner device configured to scan a document.

8. The communication apparatus according to claim 7, wherein the communication apparatus includes a transmission application for transmitting an image obtained by scanning the document by the scanner device to an image receiving external apparatus, and wherein, in a case where a host name is specified as a transmission destination to be used by the transmission application, and a user operation for starting transmission of data based on the image obtained by scanning the document is accepted, the transmission application requests the DNS client for the name resolution for the specified host name.

9. The communication apparatus according to claim 1, wherein the communication apparatus includes a cloud print application for acquiring print data from a predetermined type of cloud print service and then printing the acquired print data, and
wherein, in a case where the cloud print application makes a query to the predetermined type of cloud print service about a job, the cloud print application requests the DNS client for name resolution for a host name corresponding to the predetermined type of cloud print service.

10. The communication apparatus according to claim 9, wherein the plurality of different communication interfaces includes at least a communication interface that functions as a primary network and a communication interface that functions as a secondary network, and
wherein the operations further include:
setting a communication network to be used for communication with the predetermined type of cloud print service as an operation setting related to the predetermined type of cloud print service, and
generating, in a case where (i) a setting for using the predetermined type of cloud print service is enable and (ii) the communication interface that functions as the secondary network is set as the communication network to be used for communication with the predetermined type of cloud print service, setting the communication network includes setting a setting indicating a correspondence between one or more domain names corresponding to the predetermined type of cloud print service and a DNS server corresponding to the communication interface that functions as the secondary network.

11. The communication apparatus according to claim 1, wherein the communication apparatus includes a management application for transmitting operation information about the communication apparatus to an external operation information server, and
wherein, in a case where the management application transmits the operation information to the external operation information server, the management application requests the DNS client for the name resolution for a host name corresponding to the external operation information server.

12. The communication apparatus according to claim 11, wherein the plurality of different communication interfaces includes at least a communication interface that functions as a primary network and a communication interface that functions as a secondary network, and
wherein the operations further include:
setting a communication network to be used for transmission of the operation information as an operation setting for the management application, and
generating, in a case where (i) a setting for using the management application is enabled and (ii) the communication interface that functions as the secondary network is set as the communication network to be used for transmission of the operation information, setting the communication network includes setting a setting indicating a correspondence between one or more domain names corresponding to the external operation information server and a DNS server corresponding to the communication interface that functions as the secondary network.

13. The communication apparatus according to claim 1, wherein, in a case where name resolution by the external DNS server has been successful and an Internet Protocol (IP) address has been acquired, the DNS cache server caches a result of the name resolution.

14. A method to control a communication apparatus to transmit data outside the communication apparatus via a plurality of different communication interfaces, the method comprising:
setting, as a set communication interface correspondence, a communication interface correspondence between a domain name and a communication interface, from the plurality of different communication interfaces, wherein the set communication interface correspondence is to be used for communication with an external apparatus having an external apparatus host name and belonging to a domain identified by the domain name;
generating, based on the set communication interface correspondence, a setting indicating a Domain Name System name resolution server correspondence between the domain name and a Domain Name System (DNS) name resolution server to which name resolution for the external apparatus host name is to be transferred; and
activating a DNS cache server,
wherein the DNS cache server is configured to operate based on the generated setting,
wherein a DNS client, requested for the name resolution for the external apparatus host name by an application of the communication apparatus, transmits a request for the name resolution to the DNS cache server, and
wherein, based on a received host name included in the received request for the name resolution, the DNS cache server determines an external DNS server to which the name resolution is requested, and requests the determined external DNS server for the name resolution.

15. A non-transitory computer-readable storage medium storing a program to cause a computer to perform a method to control a communication apparatus to transmit data outside the communication apparatus via a plurality of different communication interfaces, the method comprising:
setting, as a set communication interface correspondence, a communication interface correspondence between a domain name and a communication interface, from the plurality of different communication interfaces, wherein the set communication interface correspondence is to be used for communication with an external apparatus having an external apparatus host name and belonging to a domain identified by the domain name;
generating, based on the set communication interface correspondence, a setting indicating a Domain Name System name resolution server correspondence between the domain name and a Domain Name System (DNS) name resolution server to which name resolution for the external apparatus host name is to be transferred; and
activating a DNS cache server,
wherein the DNS cache server is configured to operate based on the generated setting,
wherein a DNS client, requested for the name resolution for the external apparatus host name by an application of the communication apparatus, transmits a request for the name resolution to the DNS cache server, and wherein, based on a received host name included in the received request for the name resolution, the DNS cache server determines an external DNS server to which the name resolution is requested, and requests the determined external DNS server for the name resolution.

* * * * *